United States Patent
Chen et al.

(10) Patent No.: US 9,967,075 B2
(45) Date of Patent: May 8, 2018

(54) RADIO COMMUNICATION SYSTEM, BASE STATION, RADIO COMMUNICATION APPARATUS, AND RADIO COMMUNICATION METHOD

(71) Applicant: FUJITSU LIMITED, Kawasaki-shi, Kanagawa (JP)

(72) Inventors: Hongyang Chen, Kawasaki (JP); Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 110 days.

(21) Appl. No.: 14/850,158

(22) Filed: Sep. 10, 2015

(65) Prior Publication Data
US 2015/0381396 A1    Dec. 31, 2015

Related U.S. Application Data

(63) Continuation of application No. PCT/JP2013/058592, filed on Mar. 25, 2013.

(51) Int. Cl.
*H04L 5/00* (2006.01)
*H04W 74/08* (2009.01)
(Continued)

(52) U.S. Cl.
CPC ........ *H04L 5/0053* (2013.01); *H04J 13/0074* (2013.01); *H04J 13/16* (2013.01);
(Continued)

(58) Field of Classification Search
CPC ..... H04L 5/0053; H04L 5/001; H04L 5/0048; H04W 48/16; H04W 72/00; H04W 88/08
See application file for complete search history.

(56) References Cited

U.S. PATENT DOCUMENTS 6,968,212 B1   11/2005   Aoyama et al.
7,187,706 B2 *  3/2007   Schilling ................ H04B 1/707
                                              370/332
(Continued)

FOREIGN PATENT DOCUMENTS

AU    2006352302    6/2011
CA       2673284    7/2008
(Continued)

OTHER PUBLICATIONS

KROA—Office Action dated Feb. 1, 2017 for corresponding Korean Application No. 10-2015-7025686, with English translation.
(Continued)

*Primary Examiner* — Raj Jain
(74) *Attorney, Agent, or Firm* — Fujitsu Patent Center

(57) ABSTRACT

A base station classifies at least some of radio communication apparatuses belonging to the same cell into a plurality of groups. The base station assigns to a first group a first signal sequence that is orthogonal to a cyclically shifted version thereof, and assigns to a second group a second signal sequence that is orthogonal to a cyclically shifted version thereof and that is different from the first signal sequence and from the cyclically shifted version of the first signal sequence. The radio communication apparatus belonging to the first group performs spread modulation on data using the first signal sequence or a signal sequence obtained by cyclically shifting the first signal sequence. The radio communication apparatus belonging to the second group performs spread modulation on data using the second signal sequence or a signal sequence obtained by cyclically shifting the second signal sequence.

7 Claims, 16 Drawing Sheets

(51) Int. Cl.
*H04L 27/26* (2006.01)
*H04L 12/24* (2006.01)
*H04J 13/00* (2011.01)
*H04J 13/16* (2011.01)
*H04W 88/08* (2009.01)
*H04J 13/22* (2011.01)

(52) U.S. Cl.
CPC ...... *H04L 27/2607* (2013.01); *H04L 41/0803* (2013.01); *H04W 74/08* (2013.01); *H04J 13/0062* (2013.01); *H04J 13/22* (2013.01); *H04L 5/0048* (2013.01); *H04W 88/08* (2013.01)

(56) References Cited

U.S. PATENT DOCUMENTS

| | | | |
|---|---|---|---|
| 2002/0034967 | A1 | 3/2002 | Taniguchi et al. |
| 2008/0279170 | A1* | 11/2008 | Malladi ............... H04L 5/0017 370/343 |
| 2009/0207799 | A1 | 8/2009 | Mazzarese |
| 2009/0252112 | A1 | 10/2009 | Shimomura et al. |
| 2009/0290538 | A1 | 11/2009 | Kim et al. |
| 2010/0034108 | A1 | 2/2010 | Ode |
| 2010/0322170 | A1 | 12/2010 | Fujita et al. |
| 2012/0147837 | A1 | 6/2012 | Shimomura et al. |
| 2012/0281684 | A1 | 11/2012 | Shimomura et al. |
| 2013/0022029 | A1 | 1/2013 | Ryu et al. |
| 2015/0003407 | A1* | 1/2015 | Seo ..................... H04L 25/0224 370/330 |
| 2015/0036615 | A1* | 2/2015 | Shimezawa ........... H04W 72/00 370/329 |
| 2015/0381396 | A1* | 12/2015 | Chen .................... H04W 74/08 370/254 |

FOREIGN PATENT DOCUMENTS

| | | |
|---|---|---|
| CA | 2776257 | 7/2008 |
| CA | 2776445 | 7/2008 |
| EP | 1195921 | 4/2002 |
| EP | 2099233 | 9/2009 |
| EP | 2536088 | 12/2012 |
| EP | 2536089 | 12/2012 |
| JP | 2002-051375 | 2/2002 |
| JP | 2002-094448 | 3/2002 |
| JP | 2009-128039 | 6/2009 |
| JP | 2011-004183 | 1/2011 |
| JP | 2011-009991 | 1/2011 |
| KR | 10-2009-0090230 | 8/2009 |
| KR | 10-2011-0109961 | 10/2011 |
| WO | 01/91332 | 11/2001 |
| WO | 2008/053550 | 5/2008 |
| WO | 2008/078357 | 7/2008 |

OTHER PUBLICATIONS

EESR—The Extended European Search Report dated Mar. 2, 2016 in corresponding European Application No. 13879881.4.
Panasonic: "Frequency dependent PUSCH DM-RS generation method with considering eNB-specific allocation", 3GPP TSG RAN WG1 Meeting #51, Jeju, Korea, Nov. 5-9, 2007, R1-074902, 3rd Generation Partnership Project (3GPP), Agenda Item: 6.2.2, pp. 1-9, XP050108357.
JPOA—Office Action dated Sep. 6, 2016 for corresponding Japanese Application No. 2015-507719, with English translation of relevant part: p. 1 line 17 to p. 2 line 16 and p. 2 line 20 to line 25.
New Postcom, "Remaining issues on SRS configuration", 3GPP TSG-RAN WG1 Meeting #70, Qingdao, China, Aug. 13-17, 2012, 3GPP, R1-123352.
JPOA—Office Action dated November 22, 2016 for corresponding Japanese Application No. 2015-507719, with English translation of relevant part: p. 1 line 21 to p. 2 line 12 and p. 2 line 19 to line 22.
KROA—Office Action dated November 4, 2016 for corresponding Korean Application No. 10-2015-7025686, with English translation.
Vodafone, "Proposed SID: Provision of low-cost MTC UEs based on LTE", RP-111112, 3GPP TSG RAN Meeting #53, Sep. 13-16, 2011 (6 pages).
Huawei, HiSilicon, CMCC, "Overview on low-cost MTC UEs based on LTE", R1-112912, 3GPP TSG RAN WG1 #66bis, Oct. 10-14, 2011 (4 pages).
Sony Corporation, Sony Europe Ltd, "Considerations on Approaches for Low-Cost MTC UEs", R1-112917, 3GPP TSG RAN1 Meeting #66bis, Oct. 10-14, 2011 (2 pages).
Ericsson, ST-Ericsson, "Standards aspects impacting UE costs", R1-112929, 3GPP TSG RAN WG1 Meeting #66bis, Oct. 10-14, 2011 (3 pages).
IPWireless Inc., "Backwards compatible support for reduced bandwidth MTC LTE UEs", R1-114268, 3GPP TSG RAN WG1 Meeting #67, Nov. 14-18, 2011 (4 pages).
International Search Report and Written Opinion of the International Searching Authority (Form PCT/ISA/210, Form PCT/ISA/237), mailed in connection with PCT/JP2013/058592 and dated Apr. 23, 2013, with partial English translation (7 pages).
Panasonic, "UE-specific base sequence assignment for UL CoMP", 3GPP TSG-RAN WG1 Meeting #68, Dresden, Germany, pp. 1-5, Feb. 6-10, 2012, R1-120229.
KROA—Korean Office Action dated May 2, 2017 in corresponding Korean Application No. 10-2015-7025686, with English translation.
CNOA—First Notification of Office Action for corresponding Chinese Application No. 201380074853.3, dated Jan. 22, 2018, with English translation.

* cited by examiner

FIG. 7

SEQUENCE NUMBER/
SHIFT NUMBER

| 0 / 0 | C0(0) | C0(1) | C0(2) | C0(3) | C0(4) | ... | C0(9) | C0(10) | C0(11) |
| --- | --- | --- | --- | --- | --- | --- | --- | --- | --- |
| 0 / 1 | C0(10) | C0(11) | C0(0) | C0(1) | C0(2) | ... | C0(7) | C0(8) | C0(9) |
| 0 / 2 | C0(8) | C0(9) | C0(10) | C0(11) | C0(0) | ... | C0(5) | C0(6) | C0(7) |

⋮

| 0 / 5 | C0(2) | C0(3) | C0(4) | C0(5) | C0(6) | ... | C0(11) | C0(0) | C0(1) |
| --- | --- | --- | --- | --- | --- | --- | --- | --- | --- |

⋮

| 10 / 0 | C10(0) | C10(1) | C10(2) | C10(3) | C10(4) | ... | C10(9) | C10(10) | C10(11) |
| --- | --- | --- | --- | --- | --- | --- | --- | --- | --- |
| 10 / 1 | C10(10) | C10(11) | C10(0) | C10(1) | C10(2) | ... | C10(7) | C10(8) | C10(9) |
| 10 / 2 | C10(8) | C10(9) | C10(10) | C10(11) | C10(0) | ... | C10(5) | C10(6) | C10(7) |

⋮

| 10 / 5 | C10(2) | C10(3) | C10(4) | C10(5) | C10(6) | ... | C10(11) | C10(0) | C10(1) |
| --- | --- | --- | --- | --- | --- | --- | --- | --- | --- |

RADIO COMMUNICATION SYSTEM, BASE STATION, RADIO COMMUNICATION APPARATUS, AND RADIO COMMUNICATION METHOD

CROSS-REFERENCE TO RELATED APPLICATION

This application is a continuation application of International Application PCT/JP2013/058592 filed on Mar. 25, 2013 which designated the U.S., the entire contents of which are incorporated herein by reference.

FIELD

The present invention relates to a radio communication system, a base station, a radio communication apparatus, and a radio communication method.

BACKGROUND

Cellular radio communication systems are used today in which a plurality of radio communication apparatuses access a base station. In some of such radio communication systems, in order to allow two or more radio communication apparatuses to transmit data pieces to a base station on the same channel at the same time, the data pieces of the two or more radio communication apparatuses are code-division multiplexed by using signal sequences for spreading.

For example, according to a radio communication standard called Long Term Evolution (LTE), pieces of control data of two or more user terminals may be code-division multiplexed on an uplink control channel. An LTE base station uses a Constant Amplitude Zero Auto-Correlation (CAZAC) sequence corresponding to a cell ID. The CAZAC sequence has the property of having an autocorrelation of zero unless the phase difference is zero, and being orthogonal to any of signal sequences obtained by cyclic shifts thereof. On the other hand, the CAZAC sequence has quasi-orthogonality and thus has relatively low cross-correlation with respect to CAZAC sequences other than the signal sequences obtained by cyclic shifts thereof, but does not guarantee perfect orthogonality with respect thereto.

The LTE base station specifies different shift amounts (including zero) to one user terminal and another user terminal belonging to the same cell. Each of the two user terminals cyclically shifts the CAZAC sequence corresponding to the cell ID by the shift amount specified by the base station, and uses the cyclically shifted CAZAC sequence for spread modulation of control data. Thus, an uplink control channel signal transmitted by the one user terminal and an uplink control channel signal transmitted by the other user terminal are orthogonal to each other. Accordingly, the base station is able to separate the two uplink control channel signals even if the two uplink control channel signals are received in a superimposed manner.

As one utilization form of radio communication systems, Machine Type Communication (MTC), also called Machine-to-Machine (M2M) communication, has been discussed. Unlike user terminals such as mobile phones that perform radio communication in response to a user operation, MTC terminals are able to autonomously transmit data without being operated by the user. Examples of MTC terminals include smart meters that measure and report the energy consumption, on-vehicle equipment that monitors and reports the traveling status, electrical household appliances that monitor and report the operating status, and the like. The spread of MTC is likely to greatly increase the number of radio communication apparatuses belonging to each cell.

For supporting a large number of MTC terminals, there has also been a discussion on the method of allocating radio resources to conventional user terminals operated by the users and MTC terminals. For example, in discussions on the LTE radio communication standard, it has been proposed to provide an uplink control channel dedicated to MTC terminals in addition to a conventional uplink control channel used by conventional user terminals.

See, for example, the following documents:

Vodafone, "Proposed SID: Provision of low-cost MTC UEs based on LTE", RP-111112, 3GPP TSG-RAN meeting #53, September 2011;

Huawei, HiSilicon, CMCC, "Overview on low-cost MTC UEs based on LTE", R1-112912, 3GPP TSG-RAN WG1 meeting #66bis, October 2011;

Sony Corporation, Sony Europe Limited, "Consideration on Approaches for Low-Cost MTC UEs", R1-112917, 3GPP TSG-RAN WG1 meeting #66bis, October 2011;

Ericsson, ST-Ericsson, "Standards aspects impacting UE costs", R1-112929, 3GPP TSG-RAN WG1 meeting #66bis, October 2011; and IPWireless Inc., "Backwards compatible support for reduced bandwidth MTC LTE UEs", R1-114268, 3GPP TSG-RAN WG1 meeting #67, November 2011.

Upon assigning signal sequences for code division multiplexing to two or more radio communication apparatuses, the conventional technique described above focuses on the orthogonality between signal sequences in order to prevent interference whenever the radio communication apparatuses transmit data. For example, an LTE base station uses a plurality of orthogonal signal sequences obtained by cyclic shifts of a CAZAC sequence in a cell. However, the number of mutually orthogonal signal sequences is limited. Accordingly, with the conventional technique, there might be a shortage of signal sequences for code division multiplexing if the number of radio communication apparatuses belonging to the cell increases.

When there is a shortage of assignable signal sequences, some of the radio communication apparatuses may be made to wait to transmit data, or the number of channels for transmitting the data may be increased. In the former case, the throughput of the radio communication might be reduced. In the latter case, the usage efficiency of radio resources might be reduced, and scheduling might become complex.

On the other hand, among radio communication apparatuses belonging to the same cell, there may be radio communication apparatuses whose data transmission amount and data transmission frequency are smaller than those of other types of radio communication apparatuses. For example, many MTC terminals are likely to transmit a small amount of data intermittently at long intervals. Transmission signals from such radio communication apparatuses do not frequently interfere with transmission signals from other radio communication apparatuses.

SUMMARY

In an embodiment, there is provided a radio communication system including: a base station; and a plurality of radio communication apparatuses; wherein the base station is configured to: when the plurality of radio apparatuses belong to a same cell, classify at least some of the plurality of radio communication apparatuses into a plurality of groups including first and second groups, and assign to the first group a first signal sequence that has a property of being orthogonal to a signal sequence obtained by cyclically shifting the first signal sequence, and assign to the second group a second signal sequence that has a property of being orthogonal to a signal sequence obtained by cyclically shifting the second signal sequence, the second signal sequence being different from the first signal sequence and from the signal sequence obtained by cyclically shifting the first signal sequence; and wherein each of the plurality of radio communication apparatuses is configured to: when the radio communication apparatus belongs to the first group, perform spread modulation on data using the first signal sequence or the signal sequence obtained by cyclically shifting the first signal sequence, and transmit the data to the base station, and when the radio communication apparatus belongs to the second group, perform spread modulation on data using the second signal sequence or the signal sequence obtained by cyclically shifting the second signal sequence, and transmit the data to the base station.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of CAZAC sequences and cyclic shifts thereof;

DESCRIPTION OF EMBODIMENTS

Embodiments of the present invention will be explained below with reference to the accompanying drawings.

(First Embodiment)

Figure 1:
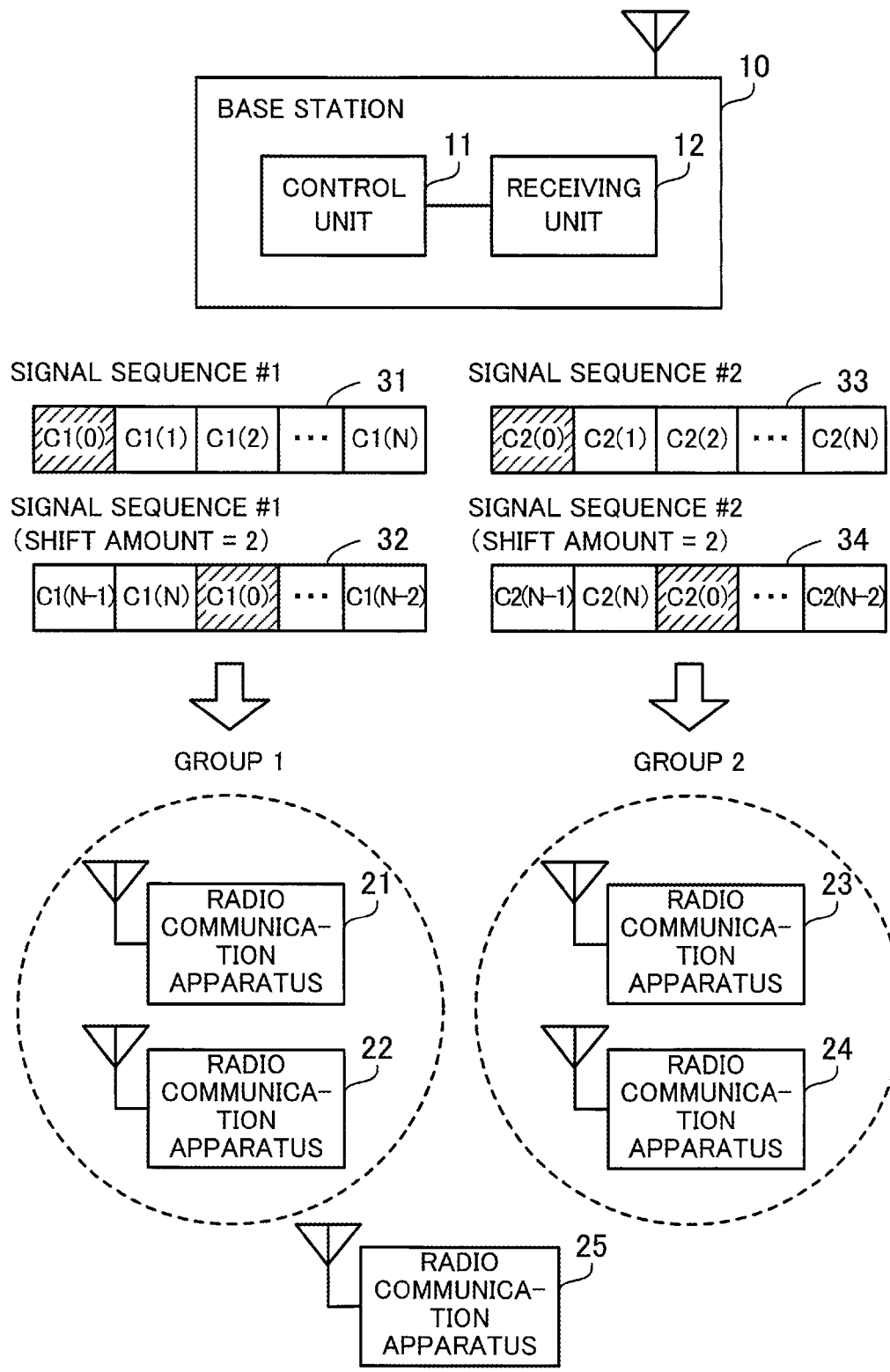
FIG. 1 illustrates a radio communication system according to a first embodiment.

FIG. 1 illustrates a radio communication system according to a first embodiment.

The radio communication system of the first embodiment includes a base station 10 and radio communication apparatuses 21 through 25. The base station manages at least one cell, and receives access from radio communication apparatuses belonging to the cell. The radio communication apparatuses 21 through 25 are able to access the base station 10. It is assumed here that the radio communication apparatuses 21 through 25 belong to the same cell.

The radio communication apparatuses 21 through 25 may be fixed radio communication apparatuses or may be mobile radio communication apparatuses. Of the radio communication apparatuses 21 through 25, the radio communication apparatuses 21 through 24 are first-type radio communication apparatuses, and the radio communication apparatus 25 is a second-type radio communication apparatus. First-type radio communication apparatuses include MTC terminals, such as smart meters, on-vehicle equipment, electrical household appliances, and the like, that are able to autonomously perform data communication without being operated by the user. Second-type radio communication apparatuses include user terminals, such as mobile phones and the like, that perform data communication in response to a user operation. The amount of transmission and the frequency of transmission of the first-type radio communication apparatus are preferably less than those of the second-type radio communication apparatus.

The base station 10 includes a control unit 11 and a receiving unit 12.

The control unit 11 classifies at least some of the radio communication apparatuses 21 through 25 into a plurality of groups including first and second groups. For example, the control unit 11 classifies the first-type radio communication apparatuses into a plurality of groups, and does not classify the second-type radio communication apparatus into any of the groups. It is assumed here that grouping is performed such that the radio communication apparatuses 21 and 22 belong to a group 1 and the radio communication apparatuses 23 and 24 belong to a group 2. Grouping of the radio communication apparatuses 21 through 24 may be performed based on the current locations of the radio communication apparatuses 21 through 24. For example, the control unit 11 performs grouping such that radio communication apparatuses located close to each other belong to the same group and radio communication apparatuses located away from each other belong to different groups.

Further, the control unit 11 assigns a signal sequence for code division multiplexing of data to each of the plurality of groups. The control unit 11 assigns a signal sequence #1 (signal sequence 31) to the group 1, and assigns a signal sequence #2 (signal sequence 33) to the group 2. The signal sequence 33 is different from the signal sequence 31 and all the signal sequences obtained by cyclic shifts of the signal sequence 31. The signal sequences 31 and 33 are different CAZAC sequences, for example. Each of the signal sequences 31 and 33 has the property of being orthogonal to signal sequences obtained by cyclic shifts thereof. On the other hand, between the signal sequence 31 or the signal sequences obtained by cyclic shifts of the signal sequence 31 and the signal sequence 33 or the signal sequences obtained by cyclic shifts of the signal sequence 33, although orthogonality is not guaranteed, quasi-orthogonality (or pseudo-orthogonality) with relatively low cross-correlation is established.

The receiving unit 12 allows data subjected to spread modulation using the signal sequence 31 or the signal sequence (including a signal sequence 32) obtained by the cyclic shift of the signal sequence 31 to be received on a certain channel from the radio communication apparatuses 21 and 22 belonging to the group 1. Further, the receiving unit 12 allows data subjected to spread modulation using the signal sequence 33 or the signal sequence (including a signal sequence 34) obtained by the cyclic shift of the signal sequence 33 to be received on the same channel described above from the radio communication apparatuses 23 and 24 belonging to the group 2. This channel may be an uplink control channel, and the data may be control data that is transmitted on the uplink control channel. Pieces of data from two or more of the radio communication apparatuses 21 through 24 may be received in a superimposed manner at the same frequency at the same time.

The receiving unit 12 may assign different directional beams to different groups, using a multi-user multiple input multiple output (MIMO) technique or a space division multiple access technique. In this case, the receiving unit 12 assigns a first beam to the group 1, and receives data from the radio communication apparatuses 21 and 22 in accordance with the first beam. Further, the receiving unit 12 assigns a second beam having a directivity different from that of the first beam to the group 2, and receives data from the radio communication apparatuses 23 and 24 in accordance with the second beam. Beamforming for data reception may be performed by, for example, weighting and combining radio signals received by a plurality of antennas.

Each of the radio communication apparatuses 21 and 22 performs spread modulation on data using the signal sequence 31 or the signal sequence obtained by the cyclic shift of the signal sequence 31, and transmits the data to the base station 10. For example, the radio communication apparatus 21 uses the signal sequence 31, and the radio communication apparatus 22 uses the signal sequence 32. In this case, transmission signals of the radio communication apparatuses 21 and 22 are expected to be orthogonal and not to interfere with each other. Similarly, each of the radio communication apparatuses 23 and 24 performs spread modulation on data using the signal sequence 33 or the signal sequence obtained by the cyclic shift of the signal sequence 33, and transmits the data to the base station 10. For example, the radio communication apparatus 23 uses the signal sequence 33, and the radio communication apparatus 24 uses the signal sequence 34. In this case, transmission signals of the radio communication apparatuses 23 and 24 are expected to be orthogonal and not to interfere with each other.

On the other hand, the signal sequences 31 and are not guaranteed to be orthogonal to the signal sequences 33 and 34. Accordingly, the risk that the transmission signals of the radio communication apparatuses 21 and 22 interfere with the transmission signals of the radio communication apparatuses 23 and 24 is not zero. However, the interference is reduced due to the quasi-orthogonality (or pseudo-orthogonality) between the signal sequences 31 and 32 and the signal sequences 33 and 34. Further, if the amount of data transmission and the frequency of data transmission of the radio communication apparatuses 21 through 24 are small, the substantial risk of interference is reduced. Further, the interference may be further reduced with use of the method of classifying the radio communication apparatuses 21 through 24 into groups based on the current locations of the respective radio communication apparatuses or the beamforming technique.

If signal sequences assignable to the radio communication apparatuses 21 through 25 are only signal sequences with guaranteed orthogonality which are obtained by cyclic shifts of a single signal sequence (for example, a single CAZAC sequence) specific to the cell, there might be a shortage of signal sequences. In this case, the throughput of radio communication might be reduced, or the usage efficiency of radio resources might be reduced. On the other hand, according to the radio communication system of the first embodiment, a plurality of signal sequences such as CAZAC sequences are prepared and allocated to a plurality of groups. Thus, it is possible to increase the number of assignable signal sequences. Further, interference within each group is easily prevented, and interference between groups is reduced. As a result, even when there are a large number of radio communication apparatuses in a cell, it is possible to improve the throughput of radio communication and the usage efficiency of radio resources.

(Second Embodiment)

Figure 2:
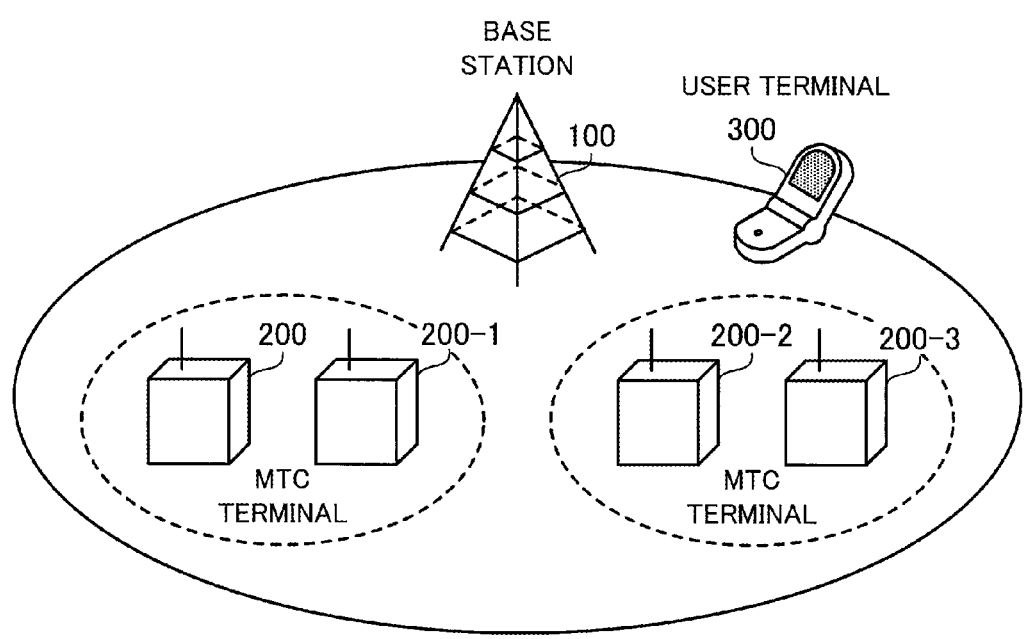
FIG. 2 illustrates a radio communication system according to a second embodiment.

FIG. 2 illustrates a radio communication system according to a second embodiment.

The radio communication system of the second embodiment is a cellular communication system. This communication system includes a base station 100, a plurality of MTC terminals including MTC terminals 200, 200-1, 200-2, and 200-3, and one or more user terminals including a user terminal 300. The MTC terminals 200, 200-1, 200-2, and 200-3 and the user terminal 300 belong to the same cell managed by the base station 100. Note that although not illustrated in FIG. 2, there are adjacent cells and adjacent base stations.

The base station 100 is a radio communication apparatus that communicates wirelessly with the MTC terminals 200, 200-1, 200-2, and 200-3 and the user terminal 300, and is connected to a wired network (not illustrated). The base station 100 receives access from the MTC terminals 200, 200-1, 200-2, and 200-3 and the user terminal 300, and establishes a radio connection so as to transmit and receive various types of user data and control data over the radio connection. The base station 100 may communicate with adjacent base stations via the wired network.

The MTC terminals 200, 200-1, 200-2, and 200-3 are radio terminal apparatuses for MTC (or M2M communication) that are able to autonomously transmit data to the base station 100 without being operated by the user. Examples of the MTC terminals 200, 200-1, 200-2, and 200-3 include smart meters, on-vehicle equipment, electrical household appliances, and the like. Each of the MTC terminals 200, 200-1, 200-2, and 200-3 periodically accesses the base station 100, and reports user data indicating an index value measured by the MTC terminal to a predetermined server via the base station 100. The amount of data transmission and the frequency of data transmission of the MTC terminals 200, 200-1, 200-2, and 200-3 are often sufficiently less than those of the user terminal 300.

The user terminal 300 is a radio terminal apparatus operated by the user. Examples of the user terminal 300 include mobile phones, personal digital assistants (PDAs), tablet computers, notebook computers, and the like. The user terminal 300 transmits e-mail to a mail server via the base station 100 in response to a user operation. The user terminal 300 also requests a Web server for content such as images and videos via the base station 100, for example. The user terminal 300 often transmits and receives a large amount of data in a burst in a short period of time. Note that the MTC terminals 200, 200-1, 200-2, and 200-3 and the user terminal 300 may be fixed radio communication apparatuses or may be mobile radio communication apparatuses.

Note that the base station 100 is an example of the base station 10 of the first embodiment. The MTC terminals 200, 200-1, 200-2, and 200-3 are examples of the radio communication apparatuses 21 through 24 of the first embodiment. The user terminal 300 is an example of the radio communication apparatus 25 of the first embodiment.

Figure 3:
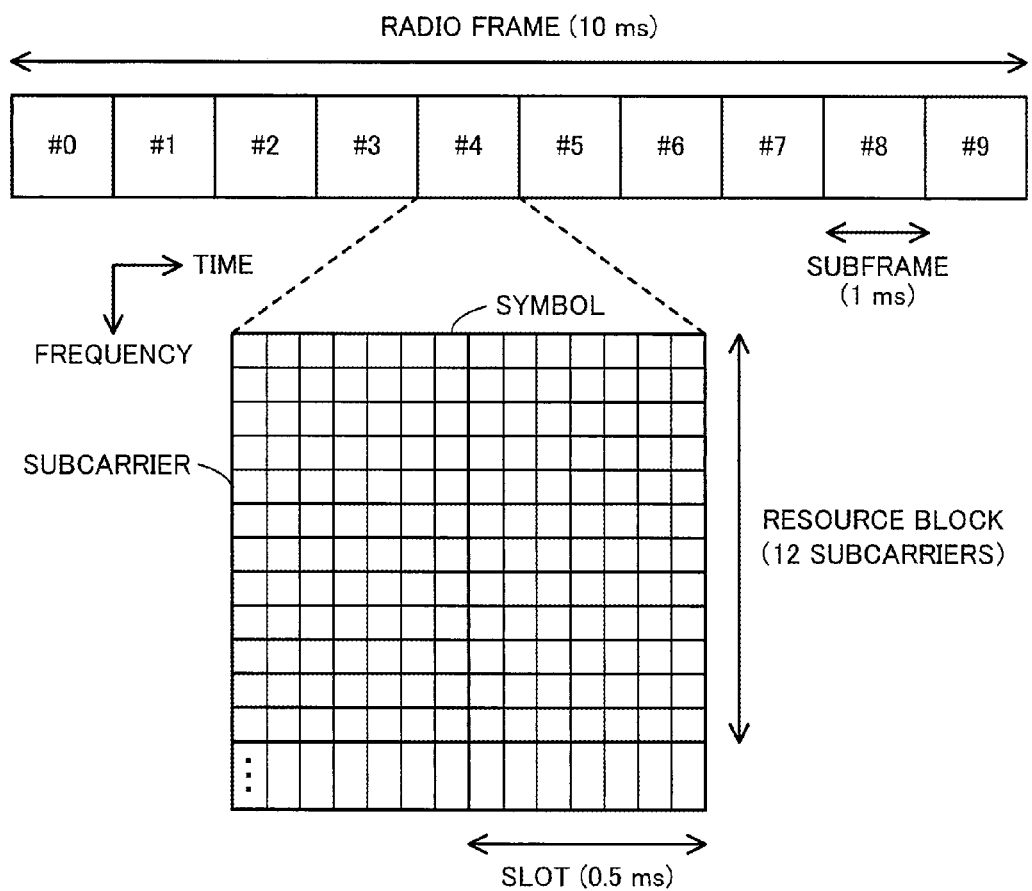
FIG. 3 illustrates an example of a radio frame.

FIG. 3 illustrates an example of a radio frame.

The radio frame as illustrated in FIG. 3 is transmitted between the base station 100 and the MTC terminals 200, 200-1, 200-2, and 200-3, and between the base station 100 and the user terminal 300. The duplex system used herein is frequency division duplex (FDD). That is, a radio frame is transmitted in each of an uplink (UL) direction from each radio terminal apparatus to the base station 100 and a downlink (DL) direction from the base station 100 to each radio terminal apparatus. However, in the second embodiment, time division duplex (TDD) may be used as the duplex system.

The radio frame is modulated with orthogonal frequency division multiplex (OFDM). The radio resources in the radio frame are divided and managed in the frequency axis direction and the time axis direction. The smallest unit of radio resources in the frequency axis direction is a subcarrier, and the smallest unit in the time axis direction is a symbol.

A radio frame with a length of 10 ms includes 10 subframes (subframes #0 through #9) with a length of 1 ms. In the frequency axis direction, each subframe includes a plurality of resource blocks (RBs) each corresponding to 12 subcarriers. The number of resource blocks included in each subframe differs depending on the width of the frequency band (system band) used by the base station 100. In the time axis direction, each subframe includes 2 slots with a width of 0.5 ms. Each slot includes 7 or 6 symbols.

With use of the radio resources described above, various types of physical channels are set between the base station 100 and the MTC terminals 200, 200-1, 200-2, and 200-3, and between the base station 100 and the user terminal 300. Uplink physical channels include a physical uplink shared channel (PUSCH) that mainly transmits user data, and a physical uplink control channel (PUCCH) that mainly transmits control data. Downlink physical channels include a physical downlink shared channel (PDSCH) that mainly transmits user data, and a physical downlink control channel (PDCCH) that mainly transmits control data.

Figure 4:
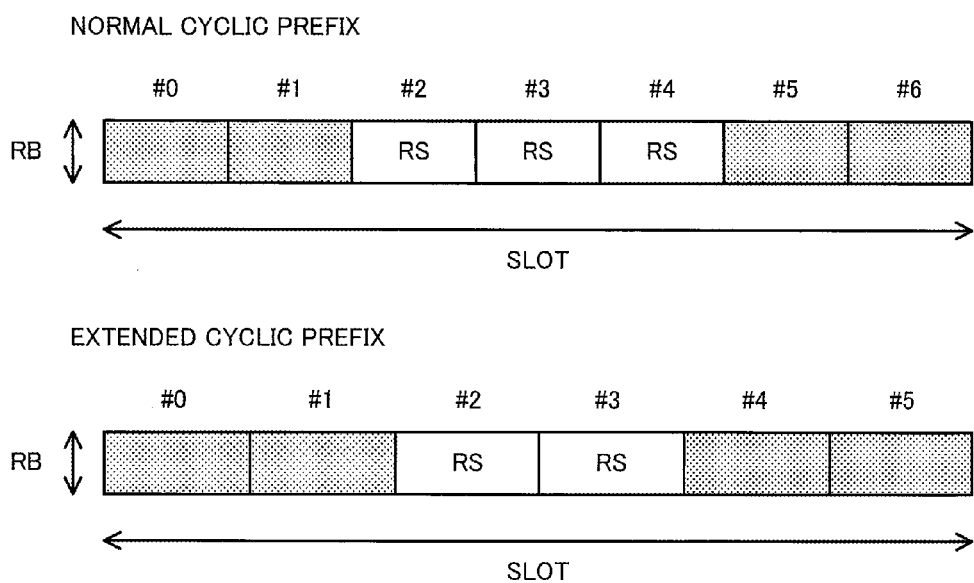
FIG. 4 illustrates an example of a PUCCH included in a radio frame.

FIG. 4 illustrates an example of a PUCCH included in a radio frame.

Taking multipath in radio communications into consideration, a guard interval called a cyclic prefix (CP) is inserted between successive symbols. A cyclic prefix is a copy of a part of the original data signal. There are two types of cyclic prefix, namely a normal cyclic prefix and an extended cyclic prefix which is longer than the normal cyclic prefix. When normal cyclic prefixes are used, each slot includes 7 symbols. When extended cyclic prefixes are used, each slot includes 6 symbols.

It is assumed here that one PUCCH is set using radio resources corresponding to 1 resource block in 1 slot. In the case where normal cyclic prefixes are used, reference signals (RSs) are transmitted on symbols #2 through #4. A reference signal is a known signal used for radio synchronization and quality measurement. On symbols #0, #1, #5, and #6 on which reference signals are not transmitted, control data may be transmitted. In the case where extended cyclic prefixes are used, reference signals are transmitted on symbols #2 and #3. On symbols #0, #1, #4, and #5 on which reference signals are not transmitted, control data may be transmitted.

The control data that may be transmitted on the PUCCH include a channel quality indicator (CQI), Acknowledgement or Negative Acknowledgement (ACK or NACK), and a scheduling request. The CQI is quality information indicating the downlink radio quality measured by a radio terminal apparatus, and is used for scheduling by the base station 100. The ACK or NACK is response information indicating whether downlink user data is successfully received by a radio terminal apparatus, and is used for retransmission control by the base station 100. The scheduling request is requesting the base station 100 for uplink radio resources when a radio terminal apparatus to which no uplink radio resources is allocated needs to transmit uplink user data.

In order to save the use of uplink radio resources, pieces of control data of a plurality of radio terminal apparatuses are code-division multiplexed on common PUCCH radio resources. The base station 100 controls assignment of codes to the radio terminal apparatuses. In the second embodiment, the base station 100 allows the MTC terminals 200, 200-1, 200-2, and 200-3 and the user terminal 300 to transmit control data on the same PUCCH radio resources at the same time. As codes used for code division multiplexing, combinations of a CAZAC sequence and an orthogonal cover code (OCC) are used as will be described below.

Figure 5:
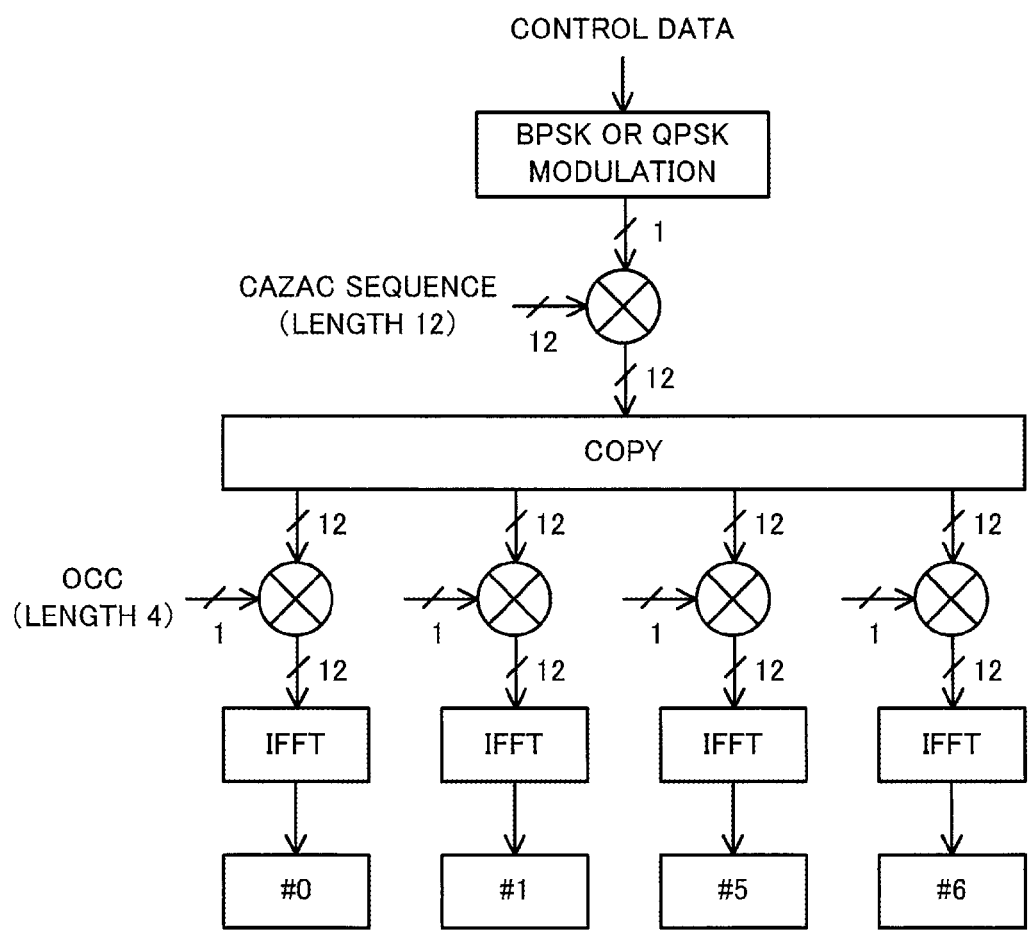
FIG. 5 is a first diagram illustrating an exemplary procedure for generating a PUCCH signal.

FIG. 5 is a first diagram illustrating an exemplary procedure for generating a PUCCH signal.

It is assumed here that the MTC terminal 200 transmits control data of the PUCCH to the base station 100. Further, normal cyclic prefixes are used in the slot to which the PUCCH is allocated. That is, the control data is transmitted on symbols #0, #1, #5, and #6.

The MTC terminal 200 digitally modulates the control data such as a CQI, ACK or NACK, a scheduling request, and the like, using binary phase shift keying (BPSK) or quadrature phase shift keying (QPSK). The MTC terminal 200 performs spread modulation on the BPSK or QPSK symbol on the frequency axis, using a CAZAC sequence with a length of 12 or a signal sequence obtained by a cyclic shift thereof. The length 12 of the CAZAC sequence corresponds to the number of subcarriers of a resource block to which the PUCCH is allocated.

Subsequently, the MTC terminal 200 further spreads, on the time axis, the spread signal with a length of 12 on the frequency axis. For example, the MTC terminal 200 makes the same number of copies (4 copies in this example) of the spread signal on the frequency axis as the number of OFDM symbols used for transmission of control data. The MTC terminal 200 applies an Inverse Fast Fourier Transform (IFFT) by multiplying the spread signal on the frequency axis by the first symbol of an OCC with a length of 4. Thus, an OFDM signal of the symbol #0 is generated. Similarly, the MTC terminal 200 applies an Inverse Fast Fourier Transform by multiplying the spread signal on the frequency axis by each of the second through fourth symbols of the OCC. Thus, OFDM signals of the symbols #1, #5, and #6 are generated.

Note that the MTC terminal 200 may generate the same OFDM signals as described above by multiplying with an OCC on the time axis, instead of multiplying with an OCC in the frequency domain. In this case, the MTC terminal 200 performs spread modulation on a BPSK or QPSK symbol using a CAZAC sequence, applies an Inverse Fast Fourier Transform so as to make the same number of copies of a spread signal on the time axis as the number of OFDM symbols. The MTC terminal 200 multiplies the spread signal on the time axis by each of the first through fourth symbols of the OCC so as to generate OFDM signals of the symbols #0, #1, #5, and #6. Note that reference signals of a plurality of radio communication apparatuses are also code-division multiplexed.

Figure 6:
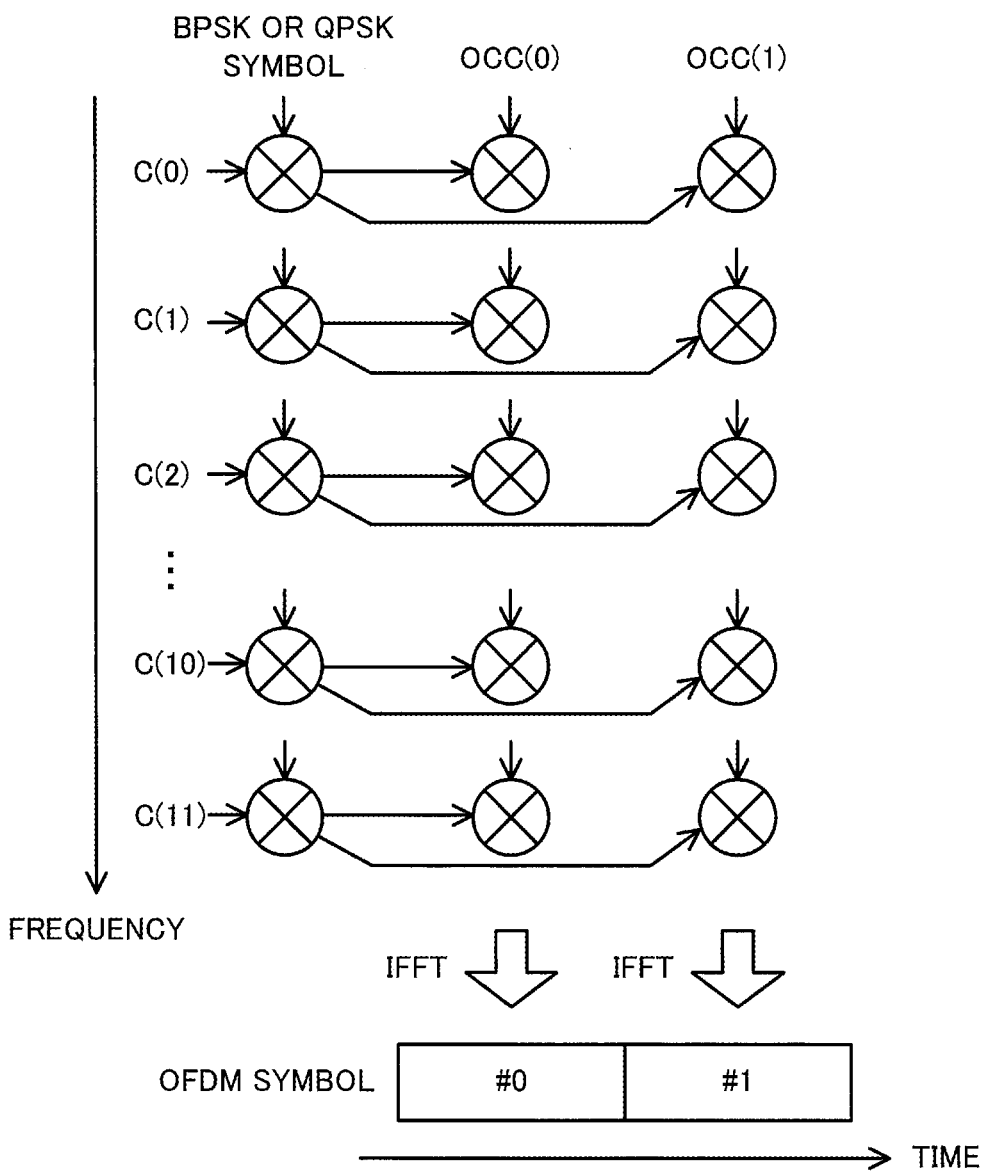
FIG. 6 is a second diagram illustrating an exemplary procedure for generating a PUCCH signal.

FIG. 6 is a second diagram illustrating an exemplary procedure for generating a PUCCH signal.

It is assumed that a signal sequence of C(0), C(1), C(2), . . . , C(10), C(11) as a CAZAC sequence or a cyclically shifted version of the CAZAC sequence is assigned to the MTC terminal 200 by the base station 100. Further, a signal sequence of OCC(0), OCC(1), OCC(2), OCC(3) as an OCC is assigned to the MTC terminal 200. Further, it is assumed that a BPSK or QPSK symbol transmitted by the MTC terminal 200 is S.

In this case, for example, a spread signal of S×C(0)×OCC (0), S×C(1)×OCC(0), S×C(2)×OCC(0), . . . , S×C(10)×OCC (0), S×C(11)×OCC(0) is generated on the frequency axis. Thus, an Inverse Fast Fourier Transform is applied to this spread signal so as to generate an OFDM signal of the symbol #0. Further, a spread signal of S×C(0)×OCC(1), S×C(1)×OCC(1), S×C(2)×OCC(1), . . . , S×C(10)×OCC(1), S×C(11)×OCC(1) is generated on the frequency axis. Thus, an Inverse Fast Fourier Transform is applied to this spread signal so as to generate an OFDM signal of the symbol #1. OFDM signals of the symbols #5 and #6 may be generated in the same manner.

The CAZAC sequence has the property of having an autocorrelation of zero and being orthogonal with respect to signal sequences obtained by cyclic shifts thereof. That is, a plurality of signal sequences prepared from the same CAZAC sequence are guaranteed to be orthogonal to each other. In the second embodiment, it is assumed that six mutually orthogonal signal sequences may be prepared from a single CAZAC sequence with a length of 12. On the other hand, the CAZAC sequence has quasi-orthogonality (or pseudo-orthogonality) and thus has relatively low cross-correlation with respect to CAZAC sequences other than the signal sequences obtained by cyclic shifts thereof, but does not guarantee perfect orthogonality with respect thereto. In the second embodiment, it is assumed that eleven CAZAC sequences with a length of 12 may be prepared.

An OCC is a signal sequence that may be prepared independently of the CAZAC sequences and that is orthogonal to other OCCs. In the second embodiment, it is assumed that three OCC with a length of 4 may be prepared. These three OCCs are orthogonal to each other on the time axis. With respect to a single CAZAC sequence, OFDM signals generated with different combinations of a shift amount (including zero) of the CAZAC sequence and an OCC are orthogonal to each other and therefor may be separated from each other. In the second embodiment, there are 6×3=18 combinations of a shift amount and an OCC for a single CAZAC sequence. That is, when 18 or less radio terminal apparatuses transmit control data on one PUCCH at the same time, the OFDM signals are separated by the base station 100 without interfering with each other. Note that, the second embodiment aims to allow more than 18 radio terminal apparatuses to perform transmission on common PUCCH radio resources, by using a plurality of CAZAC sequences in a cell.

FIG. 7 illustrates an example of CAZAC sequences and cyclic shifts thereof.

As mentioned above, the base station 100 may use eleven CAZAC sequences and six shift amounts in a cell. In the second embodiment, when two CAZAC sequences are different, it means that one of the CAZAC sequence is not the same as the other CAZAC sequence, and is not the same as a signal sequence obtained by cyclically shifting the other CAZAC sequence by an arbitrary shift amount. That is, the base station 100 prepares 11×6=66 signal sequences as signal sequences to be used by the MTC terminals 200, 200-1, 200-2, and 200-3 and the user terminal 300 to perform spread modulation on a BPSK or QPSK symbol. The eleven CAZAC sequences are identified by the sequence numbers 0 through 10, and six shift amounts are identified by the shift numbers 0 through 5.

For example, the shift number=0 is associated with the shift amount=0; the shift number=1 is associated with the shift amount=2; the shift number=2 is associated with the shift amount=4; the shift number=3 is associated with the shift amount=6; the shift number=4 is associated with the shift amount=8; and the shift number=5 is associated with the shift amount=10. It is assumed here that a CAZAC sequence with the sequence number=0 is a signal sequence of CO(0), CO(1), CO(2), CO(3), CO(4), . . . , CO(9), CO(10), CO(11). In this case, a signal sequence with the sequence number=0 and the shift number=0 is identical to the CAZAC sequence with the sequence number=0. Further, a signal sequence with the sequence number=0 and the shift number=1 is CO(10), CO(11), CO(0), CO(1), CO(2), . . . , CO(7), CO(8), CO(9).

Note that in the above example, the CAZAC sequence is cyclically shifted backward. That is, the CAZAC sequence is shifted backward by the shift amount indicated by the shift number, and signals that are shifted out of the end are shifted into the top. However, the CAZAC sequence may be shifted forward. That is, the CAZAC sequence may be shifted forward by the shift amount indicated by the shift number, and signals that are shifted out of the top are shifted into the end.

Two signal sequences with the same sequence number and different shift numbers are orthogonal to each other. For example, the signal sequence with the sequence number=0 and the shift number=0 and the signal sequence with the sequence number=0 and the shift number=1 are orthogonal to each other. On the other hand, two signal sequences with different sequence numbers have relatively low cross-correlation but might not be orthogonal to each other. For example, the signal sequence with the sequence number=0 and the shift number=0 and a signal sequence with the sequence number=10 and the shift number=1 might not be orthogonal to each other.

Figure 8:
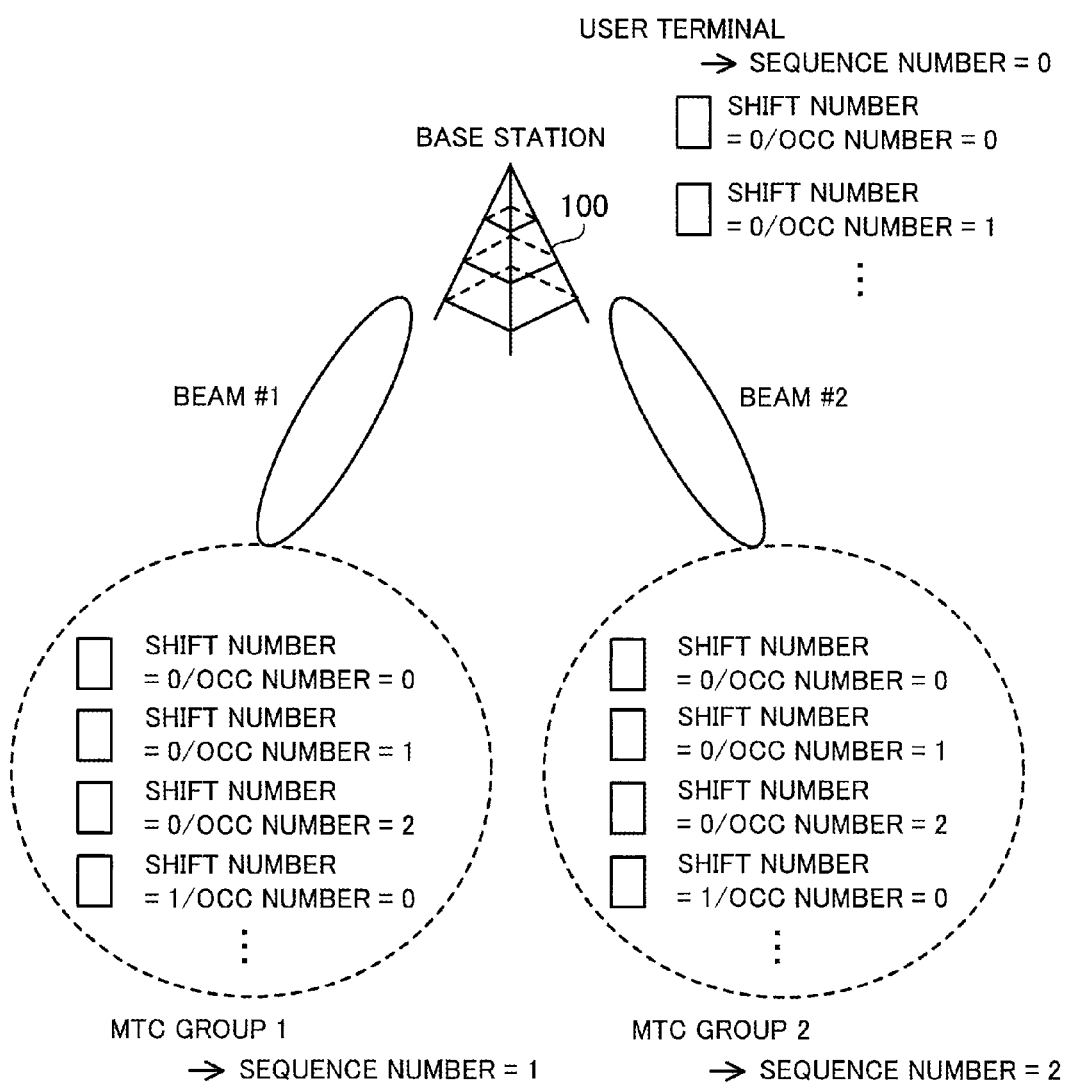
FIG. 8 illustrates an example of a method of assigning CAZAC sequences, shift amounts, and OCCs.

FIG. 8 illustrates an example of a method of assigning CAZAC sequences, shift amounts, and OCCs.

In the second embodiment, the base station 100 classifies MTC terminals belonging to the same cell into a plurality of MTC groups. Then, the base station 100 assigns a CAZAC sequence to each MTC group. One of the eleven CAZAC sequences is used for the user terminal that is not an MTC terminal, as a cell-specific CAZAC sequence. The ten CAZAC sequences other than the cell-specific CAZAC sequence are user for the MTC terminals.

The sequence number of the cell-specific CAZAC sequence is calculated from the cell ID in accordance with a predetermined calculation formula. The base station 100 allocates the ten sequence numbers other than the sequence number corresponding to the cell ID to the plurality of MTC groups. It is preferable that different MTC groups be assigned different sequence numbers as far as possible. The sequence number of the CAZAC sequence assigned to each MTC group may be calculated from the group ID of the MTC group in accordance with a predetermined calculation formula. Accordingly, the base station 100 determines a group ID of each of the plurality of MTC groups such that different MTC groups are assigned different sequence numbers as far as possible.

The base station 100 specifies, for each user terminal other than the MTC terminals, a combination of a shift amount for the cell-specific CAZAC sequence and an OCC. For example, the base station 100 reports the shift number=0 and the OCC number=0 to the user terminal 300. Note that the user terminal 300 may find the cell ID of the base station 100 when performing cell search.

On the other hand, the base station 100 specifies, for each MTC terminal, the CAZAC sequence assigned to the MTC group, and a combination of a shift amount for the cell-specific CAZAC sequence and an OCC. It is preferable that the combination of a shift amount and an OCC differ among MTC terminals in the same MTC group. That is, it is preferable that the base station 100 divide the MTC terminals into groups such that each MTC group includes 18 or less MTC terminals.

It is assumed here that the MTC terminals 200 and 200-1 belong to an MTC group 1 and the MTC terminals 200-2 and 200-3 belong to an MTC group 2. For example, the base station 100 reports to the MTC terminal 200 the group ID=n corresponding to the sequence number=1, the shift number=0, and the OCC number=0, and reports to the MTC terminal 200-1 the group ID=n, the shift number=0, and the OCC number=1. Further, for example, the base station 100 reports to the MTC terminal 200-2 the group ID=m corresponding to the sequence number=2, the shift number=2, and the OCC number=0, and reports to the MTC terminal 200-3 the group ID=m, the shift number=2, and the OCC number=1.

In the second embodiment, upon dividing a plurality of MTC terminals into groups, the base station 100 classifies MTC terminals located close to each other into the same MTC group, and MTC terminals located away from each other into different MTC groups. Then, the base station 100 performs radio communication using different directional beams for different MTC groups, with use of a multi-user multiple input multiple output (MIMO) technique or a space division multiple access technique. That is, the base station 100 receives control data from the MTC terminal 200 of the MTC group 1 and control data from the MTC terminal 200-2 of the MTC group 2 using different directional beams.

Note that in the case where a large number of MTC terminals belong to the cell, the base station 100 may allow the number of MTC groups exceed 10. That is, the base station 100 may allow the same CAZAC sequence to be assigned to an MTC group and another MTC group. In this case, it is preferable that the base station 100 assign the same CAZAC sequence to MTC groups that are located away from each other as far as possible.

Further, it is preferable that, in the vicinity of a cell boundary between two cells, different CAZAC sequences be assigned to an MTC group of one of the cells and an MTC group of the other one of the cells. Thus, it is preferable that upon determining group IDs of MTC groups located in the vicinity of the cell boundary, the base station 100 negotiate with an adjacent base station so as to adjust group IDs.

Figure 9:
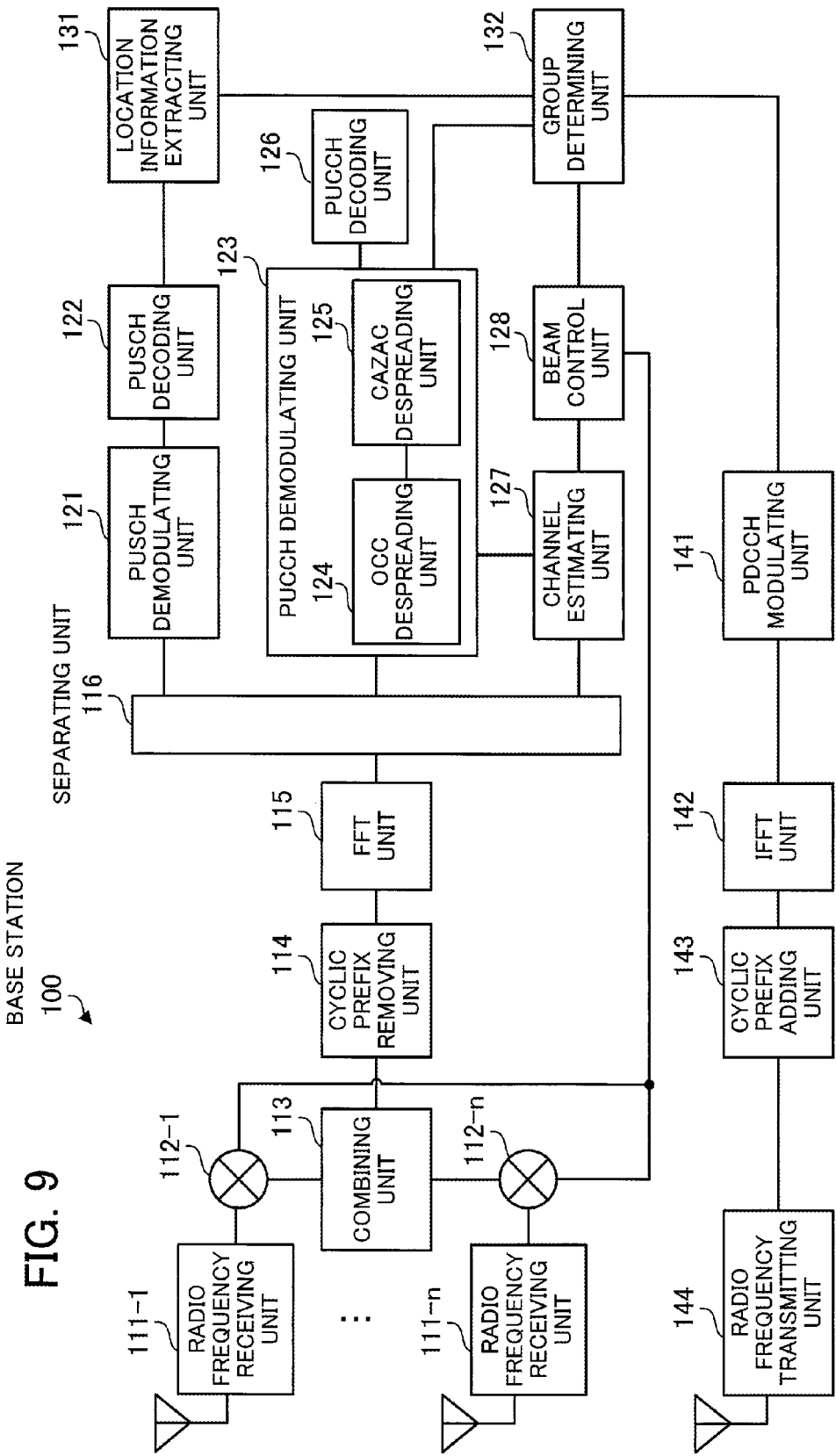
FIG. 9 is a block diagram illustrating an example of a base station.

FIG. 9 is a block diagram illustrating an example of the base station.

The base station 100 includes a plurality of radio frequency (RF) receiving units (radio frequency receiving units 111-1, . . . , and 111-n), a plurality of weighting units (weighting units 112-1, . . . , and 112-n), a combining unit 113, a cyclic prefix removing unit 114, a Fast Fourier Transform (FFT) unit 115, and a separating unit 116. Further, the base station 100 includes a PUSCH demodulating unit 121, a PUSCH decoding unit 122, a PUCCH demodulating unit 123, a PUCCH decoding unit 126, a channel estimating unit 127, and a beam control unit 128. Further, the base station 100 includes a location information extracting unit 131, a group determining unit 132, a PDCCH modulating unit 141, an IFFT unit 142, a cyclic prefix adding unit 143, and a radio frequency transmitting unit 144.

Each of the radio frequency receiving units 111-1, . . . , and 111-n converts (down-converts) a radio signal received by a corresponding antenna into a digital baseband signal. In the case of receiving radio signals with four antennas, the base station 100 includes four radio frequency receiving units corresponding to the four antennas. For down-conversion, each of the radio frequency receiving units 111-1, . . . , and 111-n includes signal processing circuits such as a quadrature demodulator, a band-pass filter (BPF), an analog-to-digital converter (ADC), and so on, for example.

Each of the weighting units 112-1, . . . , and 112-n multiplies the received signal as a digital baseband signal obtained from the corresponding radio frequency receiving unit by a weight specified by the beam control unit 128. In the case of receiving radio signals with four antennas, the base station 100 includes four weighting units corresponding to the four radio frequency receiving units.

The combining unit 113 adds up the received signals weighted by the weighting units 112-1, . . . , and 112-n, and thereby combines the signals received by the plurality of antennas. Note that in the case where the base station 100 forms a plurality of directional beams, the weight differs between beams. The weighting units 112-1, . . . , and 112-n and the combining unit 113 may process the same number of received signals as the number of beams in parallel.

The cyclic prefix removing unit 114 detects the timing of an OFDM symbol in an OFDM reception signal obtained from the combining unit 113, and removes a cyclic prefix added to the OFDM symbol. Note that since a cyclic prefix is a copy of a part of the original OFDM symbol, it is possible to find the cyclic prefix by calculating the autocorrelation between the OFDM reception signal and its delayed signal.

The FFT unit 115 applies a Fast Fourier Transform to the OFDM reception signal with the cyclic prefix removed, in units of OFDM symbols. That is, the FFT unit 115 separates a plurality of subcarrier signals superimposed on an OFDM symbol on the time axis. Note that the base station 100 may use a signal processing circuit that performs another type of Fourier transform, in place of the FFT unit 115.

The separating unit 116 separates received signals of various physical channels included in an uplink radio frame. The separating unit 116 outputs a received signal of the PUSCH to the PUSCH demodulating unit 121, and outputs a received signal of the PUCCH to the PUCCH demodulating unit 123. Further, the separating unit 116 outputs a known pilot signal such as a reference signal or the like to the channel estimating unit 127.

The PUSCH demodulating unit 121 demodulates the received signal of the PUSCH so as to extract coded user data. Modulation schemes include digital modulation schemes such as QPSK, Quadrature Amplitude Modulation (16QAM), and the like. The modulation scheme of the PUSCH may adaptively vary in accordance with the uplink radio quality of each radio terminal apparatus.

The PUSCH decoding unit 122 performs error correction decoding on the user data extracted by the PUSCH demodulating unit 121. As the error correction coding scheme, convolutional codes, turbo codes, low-density parity-check (LDPC) codes, or the like may be used. The code rate of the PUSCH may adaptively vary in accordance with the uplink radio quality of each radio terminal apparatus.

The PUCCH demodulating unit 123 demodulates the received signal of the PUCCH so as to extract coded control data. When demodulating the PUCCH, the group determining unit 132 reports to the PUCCH demodulating unit 123 the sequence number, the shift number, and the OCC number that are in use. The PUCCH demodulating unit 123 includes an OCC despreading unit 124 and a CAZAC despreading unit 125.

The OCC despreading unit 124 generates an OCC with a length of 4 corresponding to the OCC number reported from the group determining unit 132. Then, the OCC despreading unit 124 despreads and combines the four OFDM symbols (for example, the symbols #0, #1, #5, and #6) other than the reference signal symbols of the PUCCH, using the OCC with a length of 4. This despreading is performed the same number of times as the number of OCC numbers that are in use. Thus, a spread signal with a length of 12 on the frequency axis is extracted from the PUCCH of 1 resource block in 1 slot, for each OCC number.

The CAZAC despreading unit 125 generates a CAZAC sequence with a length of 12 corresponding to the sequence number reported from the group determining unit 132. A Zadoff-Chu sequence is used as the CAZAC sequence, for example. Further, when a shift number other than zero is reported from the group determining unit 132, the CAZAC despreading unit 125 cyclically shifts the CAZAC sequence by a shift amount corresponding to the shift number. Then, the CAZAC despreading unit 125 despreads the spread signal with a length of 12 on the frequency axis, using the CAZAC sequence with a length of 12 or a signal sequence obtained by a cyclic shift thereof. This despreading is performed the same number of times as the number of combinations of a sequence number and a shift number that are in use. Thus, a BPSK or QPSK symbol of the control data is extracted for each combination of a sequence number and a shift number. The PUCCH demodulating unit 123 digitally demodulates the BPSK or QPSK symbol so as to extract coded control data.

The PUCCH decoding unit 126 performs error correction decoding on the control data extracted by the PUCCH demodulating unit 123. As the error correction coding scheme, a predetermined coding scheme may be used. The control data includes a CQI, ACK or NACK, and a scheduling request.

The channel estimating unit 127 estimates the channel state of the uplink between each radio terminal apparatus and the base station 100, based on a known pilot signal such as a reference signal of the PUCCH or the like. Channel information obtained by channel estimation includes the attenuation of a transmission signal and the phase rotation amount, for example. Note that reference signals transmitted by the plurality of radio terminal apparatuses are code-division multiplexed on the reference signal OFDM symbols of the PUCCH (for example, the symbols #2 through #4). The channel estimating unit 127 is able to separate reference signals of the plurality of radio terminal apparatuses through despreading. The channel estimating unit 127 reports channel information on the PUCCH to the PUCCH demodulating unit 123, and reports channel information on various channels to the beam control unit 128.

The beam control unit 128 obtains group information indicating the corresponding relationships between the plurality of MTC terminals and MTC groups from the group determining unit 132, and also obtains channel information of each MTC terminal from the channel estimating unit 127. The beam control unit 128 forms a plurality of beams, based on the group information and the channel information, such that the base station 100 receives pieces of data from the MTC terminals belonging to different MTC groups in accordance with different directional beams. That is, the beam control unit 128 determines, for each beam, weights by which signals received by the plurality of antennas are multiplied, respectively, and reports the weights to the weighting units 112-1, . . . , and 112-n.

The location information extracting unit 131 extracts location information from the user data decoded by the PUSCH decoding unit 122. The location information is included in user data transmitted by each MTC terminal, and indicates the current location measured by the MTC terminal using the Global Positioning System (GPS). It is preferable that the location information extracting unit 131 obtain the location information of each MTC terminal periodically (for example, on an hourly basis). Note that the location information may be transmitted on the control channel (PUCCH) instead of the data channel (PUSCH). In this case, the location information extracting unit 131 extracts location information from the control data decoded by the PUCCH decoding unit 126.

The group determining unit 132 obtains the location information of each MTC terminal from the location information extracting unit 131. Then, the group determining unit 132 classifies a plurality of MTC terminals belonging to the same cell into a plurality of MTC groups based on the location information. This grouping is performed such that the MTC terminals located close to each other belong to the same MTC group and MTC terminals located away from each other belong to different MTC groups. For example, the group determining unit 132 determines a threshold for the distance in advance, and allocates a set of MTC terminals to the same MTC group such that the distance between any two of the MTC terminals is equal to or less than the threshold. It is preferable that the number of MTC terminals belonging to each group be equal to or less than the number of combinations (for example, 6×3=18) of a shift amount of a CAZAC sequence and an OCC.

Further, the group determining unit 132 assigns one of a plurality of (for example, 10) CAZAC sequences other than the cell-specific CAZAC sequence corresponding to the cell ID to each MTC group. It is preferable that different CAZAC sequences be assigned to different MTC groups. The group determining unit 132 assigns a group ID for calculating the sequence number to each MTC group such that this condition is satisfied. Further, the group determining unit 132 specifies, in each MTC group, a shift amount and an OCC for each MTC terminal. It is preferable that the combination of a shift amount and an OCC differ among MTC terminals belonging to the same MTC group.

Then, the group determining unit 132 reports group information indicating the corresponding relationships between the plurality of MTC terminals and the plurality of MTC groups to the beam control unit 128. Further, the group determining unit 132 generates, for each MTC terminal, control data including the group ID of the MTC group to which the MTC terminal belongs and intragroup assignment information. The intragroup assignment information includes the shift number indicating the shift amount specified for the MTC terminal and the OCC number indicating the OCC specified for the MTC terminal. Note that it is preferable that the group determining unit 132 re-execute grouping of the plurality of MTC terminals periodically (for example, on an hourly basis).

The PDCCH modulating unit 141 modulates control data to be transmitted to each radio terminal apparatus on the PDCCH. The control data includes the group ID and the intragroup assignment information generated by the group determining unit 132. Further, the control data includes scheduling information indicating uplink radio resources allocated to each radio terminal apparatus. The allocation of uplink radio resources is determined by a scheduler (not illustrated), in response to a scheduling request received on the PUCCH, for example. A predetermined digital modulation scheme such as QPSK and the like is used as the modulation scheme.

The IFFT unit 142 applies an Inverse Fast Fourier conversion to the modulated signals (including the modulated signal of the PDCCH) mapped to a plurality of subcarriers. That is, the IFFT unit 142 superimposes a plurality of subcarrier signals on an OFDM symbol on the time axis. Note that the base station 100 may use a signal processing circuit that performs another type of Inverse Fourier Transform, in place of the IFFT unit 142.

The cyclic prefix adding unit 143 adds a cyclic prefix to the OFDM symbol generated by the IFFT unit 142. The cyclic prefix is a copy of a part of the original OFDM symbol.

The radio frequency transmitting unit 144 converts (up-converts) a digital baseband signal as an OFDM transmission signal with the cyclic prefix added thereto into a radio signal. For up-conversion, the radio frequency transmitting unit 144 includes signal processing circuits such as a digital-to-analog converter (DAC), a quadrature modulator, a power amplifier, and so on, for example. The radio frequency transmitting unit 144 outputs the radio signal from an antenna. Note that the same antenna may serve as both a receiving antenna and a transmitting antenna.

Note that the group determining unit 132 is an example of the control unit 11 of the first embodiment. The PUCCH demodulating unit 123 is an example of the receiving unit 12 of the first embodiment.

Figure 10:
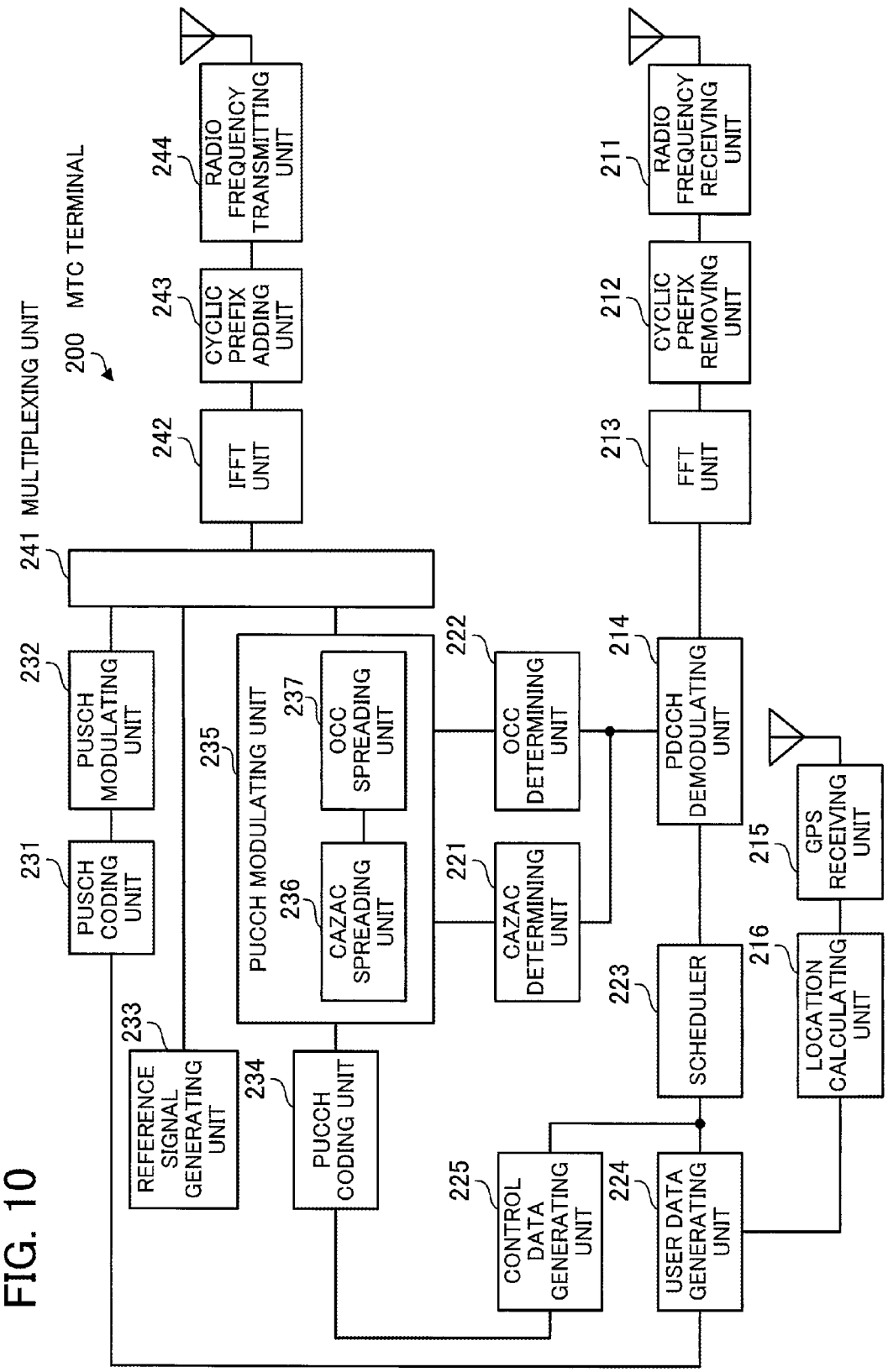
FIG. 10 is a block diagram illustrating an example of an MTC terminal.

FIG. 10 is a block diagram illustrating an example of the MTC terminal.

The MTC terminal 200 includes a radio frequency receiving unit 211, a cyclic prefix removing unit 212, an FFT unit 213, a PDCCH demodulating unit 214, a GPS receiving unit 215, and a location calculating unit 216. Further, the MTC terminal 200 includes a CAZAC determining unit 221, an OCC determining unit 222, a scheduler 223, a user data generating unit 224, and a control data generating unit 225. Further, the MTC terminal 200 includes a PUSCH coding unit 231, a PUSCH modulating unit 232, a reference signal generating unit 233, a PUCCH coding unit 234, a PUCCH modulating unit 235, a multiplexing unit 241, an IFFT unit 242, a cyclic prefix adding unit 243, and a radio frequency transmitting unit 244.

The radio frequency receiving unit 211 converts (down-converts) a radio signal received by an antenna of the MTC terminal 200 into a digital baseband signal. For down-conversion, the radio frequency receiving unit 211 includes signal processing circuits such as a quadrature demodulator, a BPF, an ADC, and so on, for example.

The cyclic prefix removing unit 212 detects the timing of an OFDM symbol in an OFDM reception signal obtained from the radio frequency receiving unit 211, and removes a cyclic prefix added to the OFDM symbol.

The FFT unit 213 applies a Fast Fourier Transform to the OFDM reception signal with the cyclic prefix removed, in units of OFDM symbols. That is, the FFT unit 213 separates a plurality of subcarrier signals superimposed on an OFDM symbol on the time axis. Note that the MTC terminal 200 may use a signal processing circuit that performs another type of Fourier transform, in place of the FFT unit 213.

The PDCCH demodulating unit 214 demodulates a received signal of the PDCCH included in a downlink radio frame. A predetermined digital modulation scheme such as QPSK and the like is used as the modulation scheme.

The GPS receiving unit 215 receives GPS signals using a GPS antenna provided in the MTC terminal 200. The GPS signals include time data transmitted by a plurality of GPS satellites.

The location calculating unit 216 obtains from the GPS receiving unit 215 the time data of the plurality of GPS satellites, and calculates the current location (longitude and latitude) of the MTC terminal 200, based on the transmission time of each of the plurality of GPS satellites and the reception time indicated by an internal clock of the MTC terminal 200. Then, the location calculating unit 216 generates location information indicating the calculated location.

The CAZAC determining unit 221 determines a CAZAC sequence and a shift amount which are assigned by the base station 100 so as to be used for spread modulation of the PUCCH. That is, the CAZAC determining unit 221 extracts a group ID from control data received on the PDCCH, and calculates a sequence number in accordance with a predetermined calculation formula (for example, a calculation formula for finding the remainder of dividing the group ID by 11). Further, the CAZAC determining unit 221 extracts a shift number included in the intragroup assignment information from the control data received on the PDCCH. Then, the CAZAC determining unit 221 reports the sequence number and the shift number to the PUCCH modulating unit 235.

The OCC determining unit 222 determines an OCC which is assigned by the base station 100 so as to be used for spread modulation of the PUCCH. That is, the OCC determining unit 222 extracts an OCC number included in the intragroup assignment information from the control data received on the PDCCH. Then, the OCC determining unit 222 reports the OCC number to the PUCCH modulating unit 235.

Note that the group ID and the intragroup assignment information may be transmitted on the data channel (PDSCH) instead of the control channel (PDCCH). In this case, the CAZAC determining unit 221 may extract a group ID and a shift number from user data, and the OCC determining unit 222 may extract an OCC number from the user data.

The scheduler 223 obtains scheduling information included in the control data received on the PDCCH. The scheduler 223 schedules transmission of user data on the PUSCH and transmission of control data on the PUCCH in accordance with the scheduling information.

The user data generating unit 224 generates user data to be transmitted on the PUSCH, in response to an instruction from the scheduler 223. The user data includes the location information generated by the location calculating unit 216 and indicating the current location of the MTC terminal 200. Note that the location information may be transmitted on the PUCCH instead of the PUSCH.

The control data generating unit 225 generates control data to be transmitted on the PUCCH, in response to an instruction from the scheduler 223. The control data includes a CQI, ACK or NACK, and a scheduling request. The CQI indicates the downlink radio quality measured by the MTC terminal 200, and may be generated periodically or in response to an instruction from the base station 100. The ACK or NACK may be generated in response to reception of user data from the base station 100. The scheduling request may be generated when there is user data needed to be transmitted to the base station 100.

The PUSCH coding unit 231 performs error correction coding on the user data generated by the user data generating unit 224. As the error correction coding scheme, convolutional codes, turbo codes, low-density parity-check codes, or the like may be used. The code rate of the PUSCH may be specified by the base station 100 in accordance with the uplink radio quality of the MTC terminal 200.

The PUSCH modulating unit 232 modulates the coded user data. Modulation schemes include digital modulation schemes such as QPSK, 16QAM, and the like. The modulation scheme for the PUSCH may be specified by the base station 100 in accordance with the uplink radio quality of the MTC terminal 200.

The reference signal generating unit 233 generates reference signals to be transmitted on predetermined OFDM symbols (for example, the symbols #2 through #4) of the PUCCH. The reference signal generating unit 233 performs spread modulation on the reference signals using a spreading code assigned to the MTC terminal 200. This spreading code may be determined in accordance with an OCC used for spread modulation of control data.

The PUCCH coding unit 234 performs error correction coding on the control data generated by the control data generating unit 225. As the error correction coding scheme, a predetermined coding scheme may be used.

The PUCCH modulating unit 235 modulates the coded user data. That is, the PUCCH modulating unit 235 digitally modulates the control data using the BPSK scheme or the QPSK scheme, and performs spread modulation on a BPSK or QPSK symbol using a CAZAC sequence and an OCC. The PUCCH modulating unit 235 includes a CAZAC spreading unit 236 and an OCC spreading unit 237.

The CAZAC spreading unit 236 generates a CAZAC sequence with a length of 12 corresponding to the sequence number reported from the CAZAC determining unit 221. The CAZAC sequence generated by the CAZAC spreading unit 236 is the same as that generated by the CAZAC despreading unit 125 of the base station 100. A Zadoff-Chu sequence is used as the CAZAC sequence, for example. Further, when a shift number other than zero is reported from the CAZAC determining unit 221, the CAZAC spreading unit 236 cyclically shifts the CAZAC sequence by a shift amount corresponding to the shift number. Then, the CAZAC spreading unit 236 performs spread modulation on the BPSK or QPSK symbol to generate a spread signal with a length of 12 on the frequency axis, using the CAZAC sequence or the signal sequence obtained by a cyclic shift thereof.

The OCC spreading unit 237 generates an OCC with a length of 4 corresponding to the OCC number reported from the OCC determining unit 222. Further, the OCC spreading unit 237 makes the same number of copies (4 copies) of the spread signal with a length of 12 generated by the CAZAC spreading unit 236 as the number of OFDM symbols for control data. Then, the OCC spreading unit 237 multiplies the spread signal with a length of 12 on the frequency axis by the first symbol of the OCC so as to generate a subcarrier signal corresponding to the first OFDM symbol. Similarly, the OCC spreading unit 237 multiplies the spread signal with a length of 12 by each of the second through fourth symbols of the OCC so as to generate subcarrier signals corresponding to the second through fourth OFDM symbols.

The multiplexing unit 241 maps various physical channels to an uplink radio frame, and thereby multiplexes transmission signals of these physical channels. The transmission signals to be multiplexed include the modulated signal of the user data generated by the PUSCH modulating unit 232, the reference signals generated by the reference signal generating unit 233, and the modulated signal of the control data generated by the PUCCH modulating unit 235.

The IFFT unit 242 applies an Inverse Fast Fourier conversion to the modulated signals that are mapped to a plurality of subcarriers. That is, the IFFT unit 242 superimposes a plurality of subcarrier signals on an OFDM symbol on the time axis. Note that the MTC terminal 200 may use a signal processing circuit that performs another type of Inverse Fourier Transform, in place of the IFFT unit 242.

The cyclic prefix adding unit 243 adds a cyclic prefix to the OFDM symbol generated by the IFFT unit 242. The cyclic prefix is a copy of a part of the original OFDM symbol.

The radio frequency transmitting unit 244 converts (upconverts) a digital baseband signal as an OFDM transmission signal with the cyclic prefix added thereto into a radio signal. For up-conversion, the radio frequency transmitting unit 244 includes signal processing circuits such as a DAC, a quadrature modulator, a power amplifier, and so on, for example. The radio frequency transmitting unit 244 outputs the radio signal from an antenna. The same antenna may serve as both the antenna for the radio frequency receiving unit 211 for receiving radio signals and the antenna for the radio frequency transmitting unit 244 for transmitting radio signals.

Note that the MTC terminals 200-1, 200-2, and 200-3 and the user terminal 300 may be realized with the same block configuration as that of the MTC terminal 200. However, the user terminal 300 generates a CAZAC sequence corresponding to the cell ID instead of the group ID.

Figure 11:
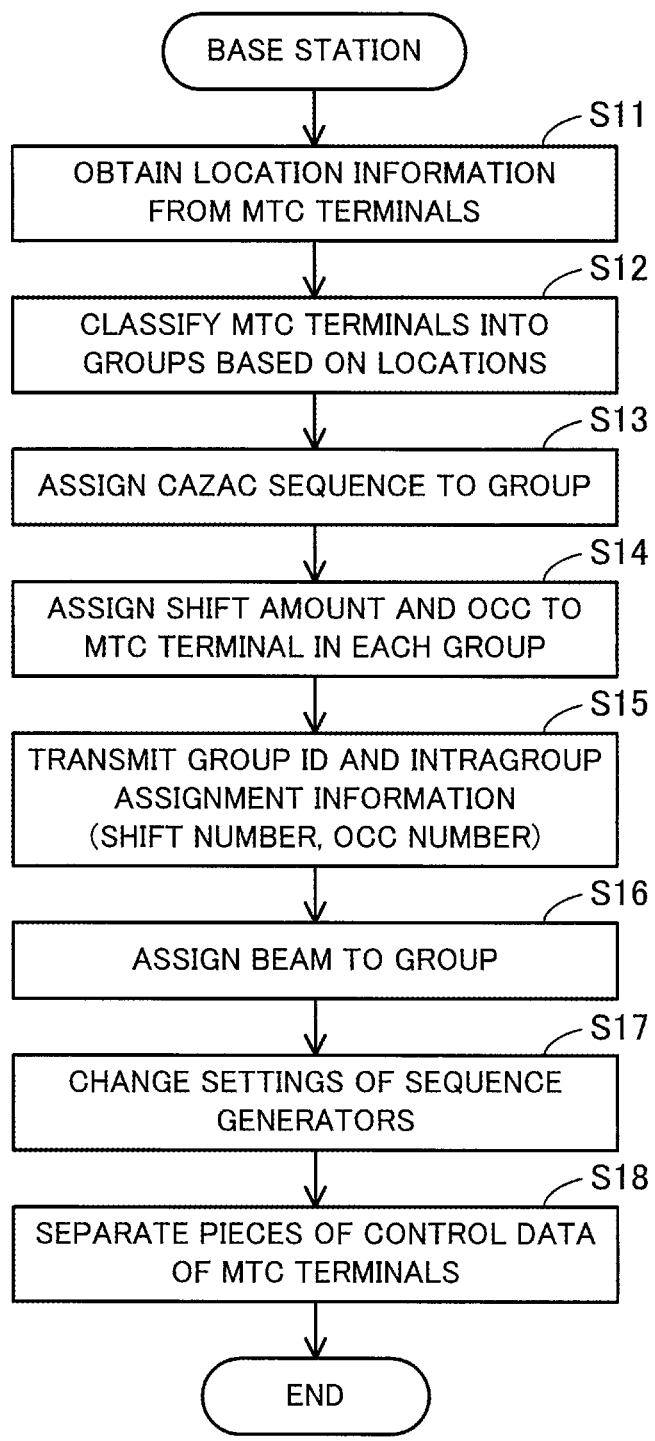
FIG. 11 is a flowchart illustrating an exemplary procedure of reception control by the base station.

FIG. 11 is a flowchart illustrating an exemplary procedure of reception control by the base station.

(S11) The location information extracting unit 131 obtains location information from each of a plurality of MTC terminals belonging to the same cell. That is, the location information extracting unit 131 extracts location information from user data transmitted from each MTC terminal. In view of the possibility that one or more MTC terminals may move, it is preferable that location information may be obtained continuously (for example, on an hourly basis). The group determining unit 132 may request each MTC terminal for location information when there is a need to obtain location information. The location information extracting unit 131 does not have to obtain location information from radio terminal apparatuses, such as the user terminal 300 and the like, that are not MTC terminals. Information indicating whether each radio terminal apparatus is an MTC terminal may be reported to the base station 100 when the radio terminal apparatus connects to the base station 100.

(S12) The group determining unit 132 classifies the plurality of MTC terminals belonging to the same cell into a plurality of MTC groups, based on the location information on the current locations obtained by the location information extracting unit 131. It is preferable that MTC terminals located close to each other belong to the same MTC group and MTC terminals located away from each other belong to different MTC groups. For example, the MTC terminals 200 and 200-1 are allocated to the MTC group 1, and the MTC terminals 200-2 and 200-3 are allocated to the MTC group 2. The group determining unit 132 does not have to divide radio terminal apparatuses, such as the user terminal 300 and the like, that are not MTC terminals into groups.

(S13) The group determining unit 132 assigns a CAZAC sequence to each of the plurality of MTC groups. The CAZAC sequences assigned to the MTC groups are different from a cell-specific CAZAC sequence determined in accordance with the cell ID. It is preferable that different CAZAC sequences be assigned to different MTC groups. The group determining unit 132 assigns a group ID to each MTC group such that this condition is satisfied.

(S14) The group determining unit 132 assigns, in each MTC group, a shift amount and an OCC to each MTC terminal belonging to the MTC group. It is preferable that the combination of a shift amount and an OCC differ among MTC terminals in the same MTC group. The group determining unit 132 may assign the same combination of a shift amount and an OCC to any two MTC terminals belonging to different MTC groups. Note that step S14 and the above-described step S13 may be performed in reverse order or in parallel.

(S15) The group determining unit 132 generates, as control data to be transmitted to each MTC terminal, the group ID of the MTC group to which the MTC terminal belongs, and intragroup assignment information including the shift number and the OCC number specified for the MTC terminal. The generated group ID and the intragroup assignment information are transmitted to each MTC terminal on the PDCCH.

Note that a shift amount for the CAZAC sequence determined in accordance with the cell ID and an OCC are assigned to each of radio terminal apparatuses, such as the user terminal 300 and the like, that are not MTC terminals. For example, the base station 100 transmits control data including a shift number and an OCC number to the user terminal 300. It is preferable that, in a set of radio terminal apparatuses that are not MTC terminals, the combination of a shift amount and an OCC differ among the radio terminal apparatuses. The same combination of a shift amount and an OCC may be assigned to an MTC terminal and a radio terminal apparatus terminal that is not an MTC terminal. Note that since each radio terminal apparatus may find the cell ID by performing cell search, the base station 100 does not have to report the cell ID to the radio terminal apparatuses that are not MTC terminals.

(S16) The beam control unit 128 assigns to each of the plurality of MTC groups a directional beam that is different from those assigned to the other MTC groups. In order to realize this, a multi-user MIMO technique or a space division multiple access technique may be used. The beam control unit 128 determines weights by which signals received by the plurality of antennas are multiplied, respectively, such that pieces of control data of the PUCCH transmitted from the MTC terminals belonging to different MTC groups are separated.

(S17) The group determining unit 132 determines combinations of a CAZAC sequence, a shift number, and an OCC in use that are specified for the radio terminal apparatuses including the MTC terminals 200, 200-1, 200-3, and 200-3 and the user terminal 300. Then, the group determining unit 132 changes the settings of sequence generators of the OCC despreading unit 124 and the CAZAC despreading unit 125 so as to extract control data subjected to spread modulation using the determined combinations. Note that steps S15 through S17 may be performed in arbitrary order or in parallel.

(S18) The combining unit 113 weights signals received by the plurality of antennas, and thereby separates the signals received with different directional beams, that is, signals received from the plurality of MTC groups from each other. The PUCCH demodulating unit 123 despreads, for each MTC group, each of spread signals of different combinations of a shift amount and an OCC, using the OCC despreading unit 124 and the CAZAC despreading unit 125. Thus, it is possible to separate pieces of control data of the plurality of MTC terminals.

Note that the beamforming technique does not have to be employed for signals received from radio terminal apparatuses, such as the user terminal 300 and the like, that are not MTC terminals. As for control data of radio terminal apparatuses that are not MTC terminals, the PUCCH demodulating unit 123 despreads spread signals of different combinations of a shift amount and an OCC, using the cell-specific CAZAC sequence.

Figure 12:
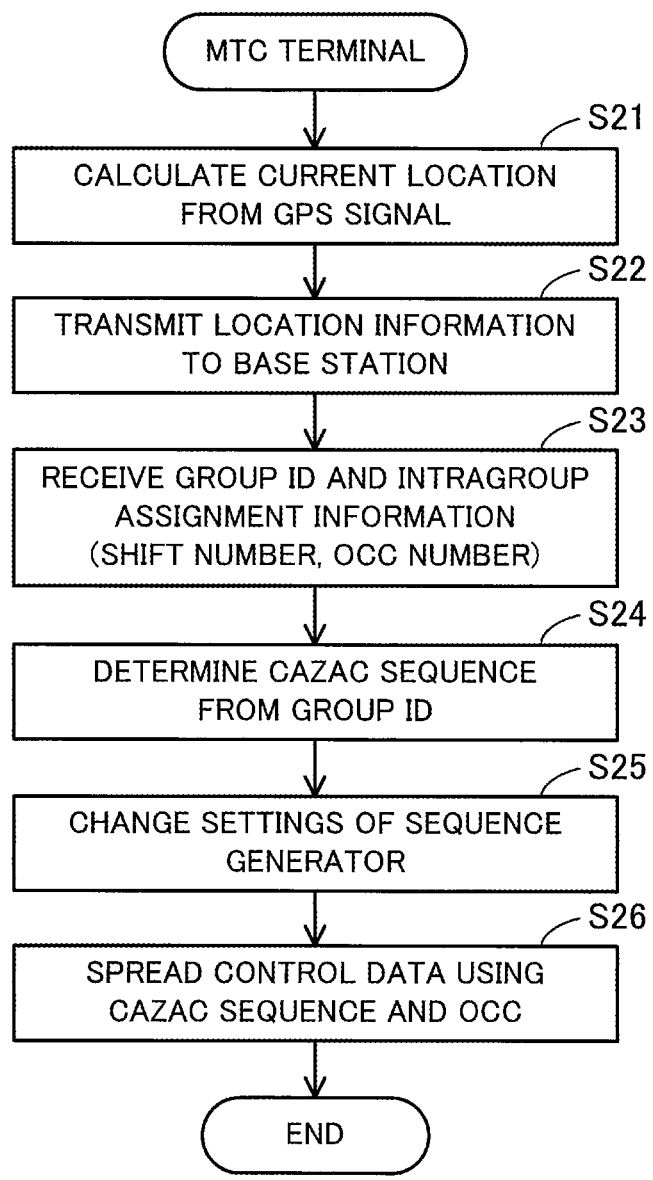
FIG. 12 is a flowchart illustrating an exemplary procedure of transmission control by the MTC terminal.

FIG. 12 is a flowchart illustrating an exemplary procedure of transmission control by the MTC terminal.

The following describes transmission control performed by the MTC terminal 200. The other MTC terminals also perform the same transmission control as the MTC terminal 200.

(S21) The location calculating unit 216 calculates the current location of the MTC terminal 200 based on received GPS signals. More specifically, the location calculating unit 216 estimates the longitude and latitude of the current location of the MTC terminal 200, based on the difference between the transmission time of a GPS signal of each of a plurality of GPS satellites and the reception time of the GPS signal indicated by an internal clock of the MTC terminal 200. The location calculating unit 216 may calculate the current location periodically or in response to an instruction from the base station 100.

(S22) The user data generating unit 224 generates user data including location information indicating the current location calculated by the location calculating unit 216. This location information is transmitted on the PUSCH to the base station 100. Generation and transmission of location information may be performed periodically without any instruction from the base station 100, or may be performed when an instruction is received from the base station 100.

(S23) The CAZAC determining unit 221 obtains a group ID and a shift number of intragroup assignment information received on the PDCCH from the base station 100. The OCC determining unit 222 obtains an OCC number of the intragroup assignment information received on the PDCCH from the base station 100. The group ID is the one assigned to the MTC group to which the MTC terminal 200 belongs. The shift number and the OCC number are those assigned to the MTC terminal 200.

(S24) The CAZAC determining unit 221 calculates a sequence number from the group ID in accordance with a predetermined calculation formula, and thereby determines a CAZAC sequence assigned to the MTC group to which the MTC terminal 200 belongs. The calculation formula for calculating a sequence number from a group ID may be the same as the calculation formula for calculating a cell-specific CAZAC sequence from a cell ID.

(S25) The CAZAC determining unit 221 reports the sequence number and the shift number to the CAZAC spreading unit 236 so as to change the settings of a sequence generator of the CAZAC spreading unit 236. This allows the CAZAC spreading unit 236 to generate a signal sequence that is identified by the sequence number and the shift number. The OCC determining unit 222 reports the OCC number to the OCC spreading unit 237 so as to change the settings of the sequence generator of the OCC spreading unit 237. This allows the OCC spreading unit 237 to generate an OCC that is identified by the OCC number.

(S26) The PUCCH modulating unit 235 performs spread modulation on the control data of the PUCCH, using the CAZAC spreading unit 236 and the OCC spreading unit 237. Thus, it is possible to transmit the control data of the MTC terminal 200 and control data of other radio terminal apparatuses using common PUCCH radio resources.

Figure 13:
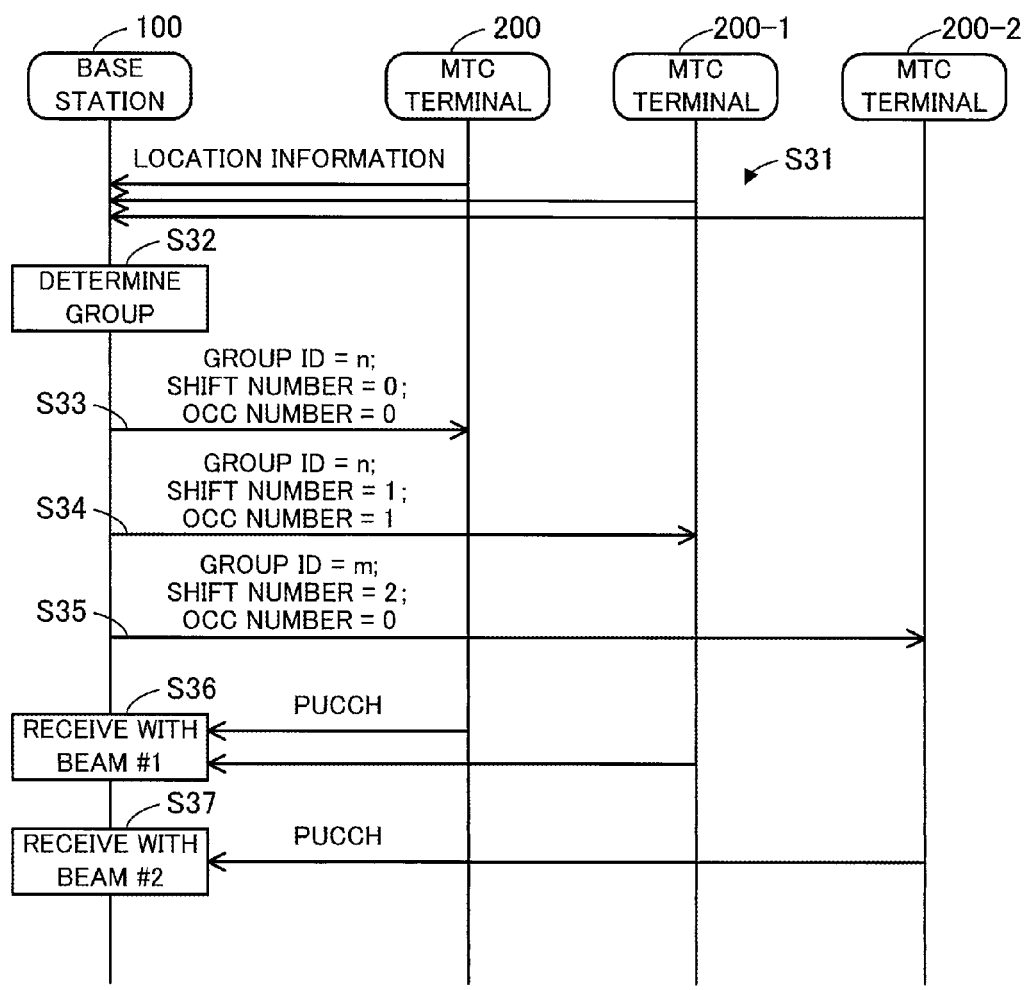
FIG. 13 is a sequence diagram illustrating an example of communication between a base station and MTC terminals.

FIG. 13 is a sequence diagram illustrating an example of communication between a base station and MTC terminals.

In this example, the MTC terminals 200, 200-1, and 200-2 are controlled.

(S31) The MTC terminal 200 calculates the current location of the MTC terminal 200, and transmits location information indicating the current location to the base station 100. Similarly, the MTC terminal 200-1 calculates the current location of the MTC terminal 200-1 and transmits location information to the base station 100, and the MTC terminal 200-2 calculates the current location of the MTC terminal 200-2 and transmits location information to the base station 100. The base station 100 collects location information periodically on an hourly basis, for example.

(S32) The base station 100 divides the MTC terminals 200, 200-1, and 200-2 into groups, based on the location information received from the MTC terminals 200, 200-1, and 200-2. In this example, the base station 100 allocates the MTC terminals 200 and 200-1 to the MTC group 1, and allocates the MTC terminal 200-2 to the MTC group 2.

(S33) The base station 100 reports the group ID=n indicating the MTC group 1 to the MTC terminal 200. The base station 100 assigns the shift number=0 and the OCC number=0 to the MTC terminal 200, and reports this assignment to the MTC terminal 200.

(S34) The base station 100 reports the group ID=n indicating the MTC group 1 to the MTC terminal 200-1. Further, the base station 100 assigns the shift number=1 and the OCC number=1 to the MTC terminal 200-1, and reports this assignment to the MTC terminal 200-1.

(S35) The base station 100 reports the group ID=m indicating the MTC group 2 to the MTC terminal 200-2. Further, the base station 100 assigns the shift number=2 and the OCC number=0 to the MTC terminal 200-2, and reports this assignment to the MTC terminal 200-2. Note that reporting operations in steps S33 through S35 may be performed at the same time or may be performed at different times.

(S36) The MTC terminal 200 performs spread modulation of control data, using the CAZAC sequence corresponding to the group ID=n and the OCC with the OCC number=0, when transmitting the control data on the PUCCH to the base station 100. The MTC terminal 200-1 performs spread modulation of control data, using a cyclically shifted version of the CAZAC sequence corresponding to the group ID=n and the OCC with the OCC number=1, when transmitting the control data on the PUCCH to the base station 100. The base station 100 receives OFDM signals of the PUCCH transmitted by the MTC terminals 200 and 200-1, with a directional beam #1 corresponding to the MTC group 1.

(S37) The MTC terminal 200-2 performs spread modulation of control data, using a cyclically shifted version of the CAZAC sequence corresponding to the group ID=m and the OCC with the OCC number=0, when transmitting the control data on the PUCCH to the base station 100. The base station 100 receives OFDM signals of the PUCCH transmitted by the MTC terminal 200-2, with a directional beam #2 (having a directivity different from that of the beam #1) corresponding to the MTC group 2. The OFDM signals in step S36 and the OFDM signals in step S37 may be superimposed on common PUCCH radio resources.

In this case, the spread signal of the MTC terminal 200 and the spread signal of the MTC terminal 200-1 are orthogonal and do not interfere with each other, because signal sequences with the same sequence number and different shift numbers are used. Further, the spread signal of the MTC terminal 200-1 and the spread signal of the MTC terminal 200-2 are orthogonal and do not interfere with each other, because different OCCs are used. On the other hand, the spread signal of the MTC terminal 200 and the spread signal of the MTC terminal 200-2 are quasi-orthogonal (or pseudo-orthogonal), because signal sequences based on different CAZAC sequences and the same OCC are used.

The MTC terminals 200, 200-1, and 200-2 are allowed to transmit the spread signals on PUCCH radio resources that are common thereto, and are allowed to transmit the spread signals on PUCCH radio resources that are common to the user terminal 300. The transmission amount and transmission frequency of control data of the MTC terminals 200, 200-1, and 200-2 are often relatively small. Therefore, the likelihood that the spread signals of the MTC terminals 200, 200-1, and 200-2 are superimposed on common PUCCH radio resources and the likelihood that the spread signals of the MTC terminals 200, 200-1, and 200-2 and the spread signal of the user terminal 300 are superimposed on common PUCCH radio resources are expected not to be high.

According to the radio communication system of the second embodiment, a plurality of MTC terminals belonging to the same cell are classified into a plurality of MTC groups, and a CAZAC sequence is assigned to each MTC group. Therefore, compared to the case where only one CAZAC sequence is used in a cell, it is possible to increase the number of MTC terminals allowed to perform transmission on common PUCCH radio resources.

Further, among MTC terminals belonging to the same MTC group, spread signals may be made orthogonal to each other, and it is therefore possible to prevent interference. Further, even among MTC terminals belonging to different MTC groups, since spread signals are orthogonal if different OCCs are used, it is possible to reduce the probability of occurrence of interference. Further, even in the case where MTC terminals belonging to different MTC groups use the same OCC, since spread signals are orthogonal, it is possible to reduce interference to some extent.

Further, since the transmission amount and transmission frequency of control data of the MTC terminal are assumed to be relatively small, the probability that MTC terminals belonging to different MTC groups transmit spread signals at the same time using the same OCC is not high, and therefore the substantial likelihood of interference is reduced. Further, since the base station 100 receives spread signals from MTC terminals belonging to different MTC groups in accordance with different directional beams, the likelihood of interference is further reduced. Further, since each MTC terminal is allowed to transmit control data using PUCCH radio resources common to the user terminal 300, scheduling by the base station 100 is simplified, and the amount of uplink radio resources for PUCCH may be reduced.

(Third Embodiment)

Next, a description will be given of a third embodiment. The following mainly discusses the differences from the second embodiment, and will not further describe the same features as those of the second embodiment. A mobile communication system of the third embodiment is different from that of the second embodiment in the method of calculating the current location of each MTC terminal. The radio communication system of the third embodiment includes a base station 100a, in place of the base station 100 of FIG. 2. Further, the radio communication system of the third embodiment includes MTC terminals 200a, 200a-1, and 200a-2, in place of the MTC terminals 200, 200-1, and 200-2 of FIG. 2.

Figure 14:
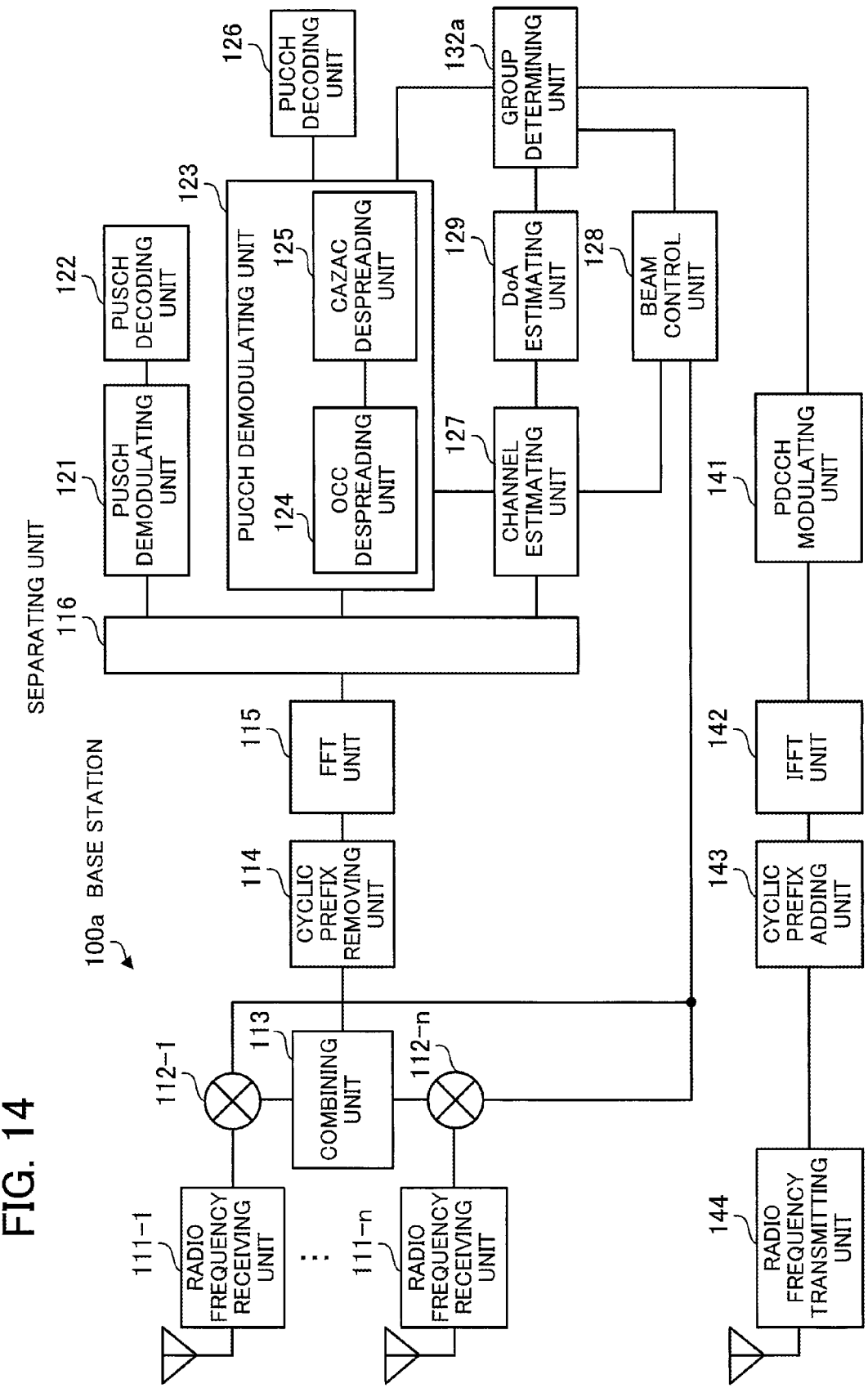
FIG. 14 is a block diagram illustrating another example of a base station.

FIG. 14 is a block diagram illustrating another example of a base station.

The base station 100a includes radio frequency receiving units 111-1, . . . , and 111-n, weighting units 112-1, . . . , and 112-n, a combining unit 113, a cyclic prefix removing unit 114, an FFT unit 115, and a separating unit 116. Further, the base station 100a includes a PUSCH demodulating unit 121, a PUSCH decoding unit 122, a PUCCH demodulating unit 123, a PUCCH decoding unit 126, a channel estimating unit 127, a beam control unit 128, and a Direction of Arrival (DoA) estimating unit 129. Further, the base station 100a includes a group determining unit 132a, a PDCCH modulating unit 141, an IFFT unit 142, a cyclic prefix adding unit 143, and a radio frequency transmitting unit 144.

The DoA estimating unit 129 obtains, from the channel estimating unit 127, channel information indicating the channel state of the uplink between each MTC terminal belonging to a cell managed by the base station 100a and the base station 100a. Then, the DoA estimating unit 129 estimates, based on the channel information of each MTC terminal, the direction in which the MTC terminal is present as viewed from the base station 100a (the direction of arrival of a radio signal from the MTC terminal). Various estimation methods may be used for estimation of the direction of arrival, such as a beamformer method and a method of using the phase difference between signals received by a plurality of antennas.

In this way, the base station 100a estimates, based on a signal received from each MTC terminal, the direction in which the MTC terminal is present. Accordingly, the base station 100a does not have to obtain, from each of the plurality of MTC terminals, location information indicating the current location measured by the MTC terminal using the GPS. Thus, the base station 100a does not have to include the location information extracting unit 131 illustrated in FIG. 9.

However, the base station 100a may perform both estimation of the direction of arrival using the DoA estimating unit 129, and collection of location information using the location information extracting unit 131. For example, the base station 100a may determine the location of an MTC terminal having a GPS receiving function based on location information, and may estimate the location of an MTC terminal not having a GPS receiving function based on the direction of arrival of a radio signal. Further, the base station 100a may use both the location information and the estimation result of the direction of arrival so as to determine the location of each MTC terminal with higher reliability.

The group determining unit 132a obtains, from the DoA estimating unit 129, direction information indicating the direction in which each MTC terminal is present as viewed from the base station 100a (for example, the angle on a horizontal plane with respect to a predetermined reference direction). The group determining unit 132a classifies a plurality of MTC terminals belonging to the same cell into a plurality of MTC groups, based on the obtained direction information. This grouping is performed such that MTC terminals that are in the directions close to each other belong to the same MTC group and MTC terminals that are in the directions away from each other belong to different MTC groups. For example, the group determining unit 132a determines a threshold for the angle in advance, and classifies a set of MTC terminals into the same MTC group such that the difference in the direction (angle) between any two of the MTC terminals is equal to or less than the threshold. Operations of the group determining unit 132a other than grouping are the same as those of the group determining unit 132 of FIG. 9.

Figure 15:
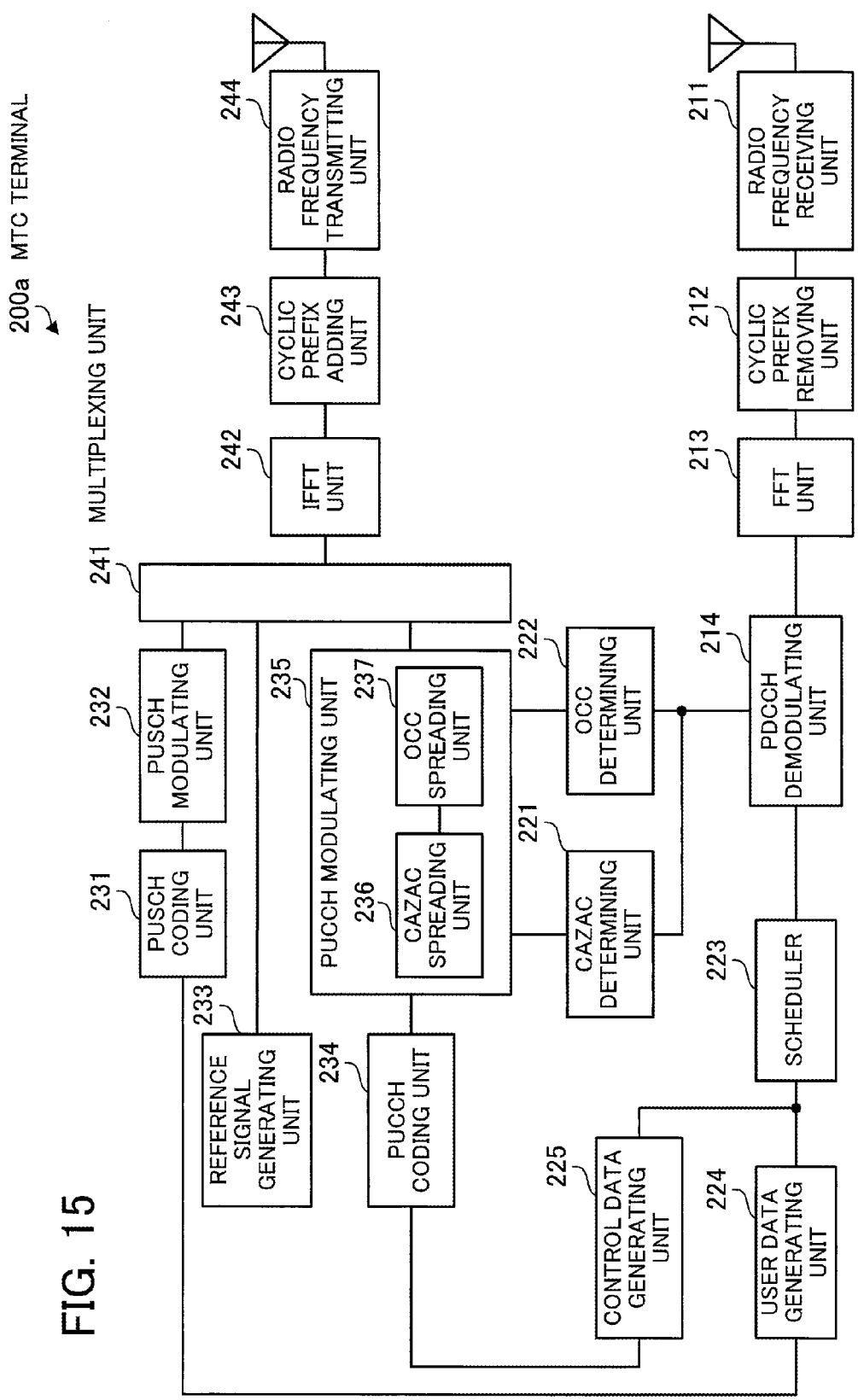
FIG. 15 is a block diagram illustrating another example of an MTC terminal.

FIG. 15 is a block diagram illustrating another example of an MTC terminal.

The MTC terminal 200a includes a radio frequency receiving unit 211, a cyclic prefix removing unit 212, an FFT unit 213, a PDCCH demodulating unit 214, a CAZAC determining unit 221, an OCC determining unit 222, a scheduler 223, a user data generating unit 224, and a control data generating unit 225. Further, the MTC terminal 200a includes a PUSCH coding unit 231, a PUSCH modulating unit 232, a reference signal generating unit 233, a PUCCH coding unit 234, a PUCCH modulating unit 235, a multiplexing unit 241, an IFFT unit 242, a cyclic prefix adding unit 243, and a radio frequency transmitting unit 244.

As will be appreciated from the above, the MTC terminal 200a does not have to include the GPS receiving unit 215 or the location calculating unit 216 illustrated in FIG. 10. That is, the MTC terminal 200a does not have to transmit, to the base station 100a, location information indicating the current location of the MTC terminal 200a. However, the MTC terminal 200a may transmit location information to the base station 100a so as to allow the base station 100a to accurately determine the current location of the MTC terminal 200a. Other MTC terminals may be realized with the same block configuration as that of the MTC terminal 200a.

Figure 16:
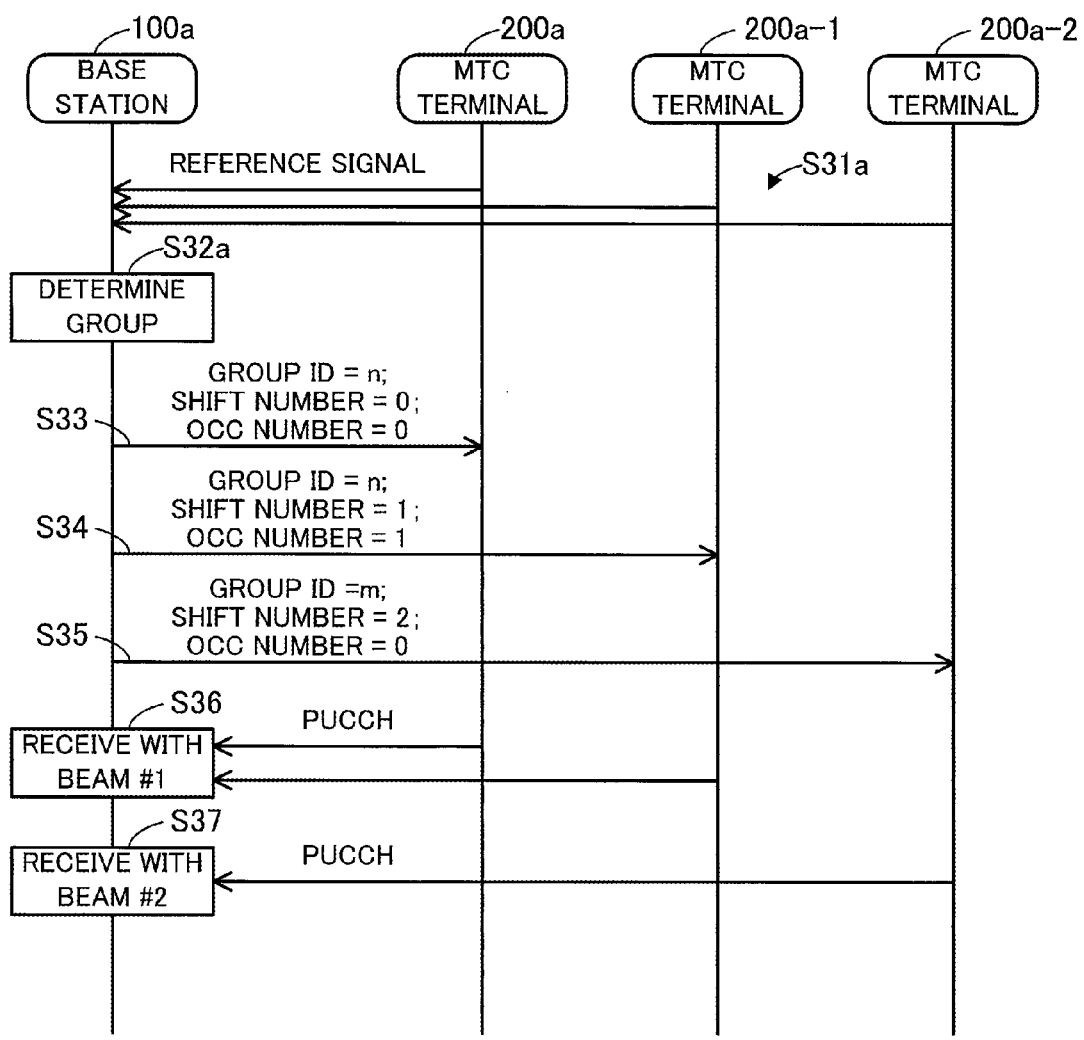
FIG. 16 is a sequence diagram illustrating another example of communication between a base station and MTC terminal.

FIG. 16 is a sequence diagram illustrating another example of communication between a base station and MTC terminals.

It this example, the MTC terminals 200a, 200a-1, and 200a-2 are controlled. Note that steps S33 through S37 are the same as those illustrated in FIG. 13.

(S31a) The MTC terminal 200a transmits a known pilot signal such as a reference signal and the like to the base station 100a. Similarly, each of the MTC terminals 200a-1 and 200a-2 transmits a known pilot signal to the base station 100a. The reference signals of the MTC terminal 200a, 200a-1, and 200a-2 are transmitted so as to be distinguishable from each other by the base station 100a.

(S32a) The base station 100a estimates the direction in which each of the MTC terminals is present as viewed from the base station 100a, using the pilot signals such as reference signals and the like received from the MTC terminals 200a, 200a-1, and 200a-2. Then, the base station 100a divides the MTC terminals 200a, 200a-1, and 200a-2 into groups, based on the estimated directions of the presence. In this example, the base station 100a allocates the MTC terminals 200a and 200a-1 to the MTC group 1, and allocates the MTC terminal 200a-2 to the MTC group 2.

According to the radio communication system of the third embodiment, the same effects as those obtained by the radio communication system of the second embodiment may be obtained. Further, according to the radio communication system of the third embodiment, the location of each MTC terminal is estimated by the base station 100a, based on a radio signal from the MTC terminal. Accordingly, even if one or more of a plurality of MTC terminals belonging to a cell do not have a GPS receiving function, it is possible to appropriately divide the MTC terminals into groups.

According to an aspect, it is possible to increase the number of radio communication apparatuses allowed to transmit data on a certain channel.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A radio communication system comprising:
   a base station; and
   a plurality of radio communication apparatuses that include first-type and second-type radio communication apparatuses;
   wherein the base station is configured to:
   when the plurality of radio communication apparatuses belong to a same cell, classify the first-type radio communication apparatuses into a plurality of groups including first and second groups, without classifying the second-type radio communication apparatuses into any of the groups, and
   assign to the first group a first signal sequence that has a property of being orthogonal to a signal sequence obtained by cyclically shifting the first signal sequence, assign to the second group a second signal sequence that has a property of being orthogonal to a signal sequence obtained by cyclically shifting the second signal sequence, and assign to the second-type radio communication apparatuses a third signal sequence determined in accordance with the same cell, the second signal sequence being different from the first signal sequence and from the signal sequence obtained by cyclically shifting the first signal sequence; and
   wherein each of the plurality of radio communication apparatuses is configured to:
   when the radio communication apparatus belongs to the first group, perform spread modulation on data using the first signal sequence or the signal sequence obtained by cyclically shifting the first signal sequence, and transmit the data to the base station, and
   when the radio communication apparatus belongs to the second group, perform spread modulation on data using the second signal sequence or the signal sequence obtained by cyclically shifting the second signal sequence, and transmit the data to the base station.

2. The radio communication system according to claim 1, wherein the base station communicates with the radio communication apparatus belonging to the first group using a first directional beam, and communicates with the radio communication apparatus belonging to the second group using a second directional beam different from the first directional beam.

3. The radio communication system according to claim 1, wherein the base station classifies the first-type radio communication apparatuses into the plurality of groups based on locations of the first-type radio communication apparatuses.

4. The radio communication system according to claim 1,
   wherein each of the radio communication apparatuses cyclically shifts the signal sequence in accordance with a shift amount specified by the base station, upon performing spread modulation on the data; and
   wherein the base station allows a same shift amount to be specified for one of the radio communication apparatuses belonging to the first group and one of the radio communication apparatuses belonging to the second group.

5. A base station capable of communicating with a plurality of radio communication apparatuses belonging to a same cell, the base station comprising:
   a control unit that classifies first-type radio communication apparatuses belonging to the same cell into a plurality of groups including first and second groups, without classifying second-type radio communication apparatuses belonging to the same cell into any of the groups, assigns to the first group a first signal sequence that has a property of being orthogonal to a signal sequence obtained by cyclically shifting the first signal sequence, assigns to the second group a second signal sequence that has a property of being orthogonal to a signal sequence obtained by cyclically shifting the second signal sequence, and assigns to the second-type radio communication apparatuses a third signal sequence determined in accordance with the same cell, the second signal sequence being different from the first signal sequence and from the signal sequence obtained by cyclically shifting the first signal sequence; and
   a receiving unit that allows a transmission signal from the first group generated by spread modulation using the first signal sequence or the signal sequence obtained by cyclically shifting the first signal sequence and a transmission signal from the second group generated by spread modulation using the second signal sequence or the signal sequence obtained by cyclically shifting the second signal sequence to be received in a superimposed manner.

6. A radio communication apparatus comprising:
   a receiving unit that receives information on a group to which the radio communication apparatus belongs, from a base station that classifies first-type radio communication apparatuses belonging to a same cell into a plurality of groups including first and second groups, without classifying second-type radio communication apparatuses belonging to the same cell into any of the groups; and
   a modulating unit that performs spread modulation on data to be transmitted to the base station, using a signal sequence corresponding to the group to which the radio communication apparatus belongs;
   wherein when the radio communication apparatus belongs to the first group, the modulating unit performs spread modulation on the data, using a first signal sequence that has a property of being orthogonal to a signal sequence obtained by cyclically shifting the first signal sequence or the signal sequence obtained by cyclically shifting the first signal sequences;
   wherein when the radio communication apparatus belongs to a second group different from the first group, the modulating unit performs spread modulation on the data, using a second signal sequence that has a property of being orthogonal to a signal sequence obtained by cyclically shifting the second signal sequence, the second signal sequence being different from the first signal sequence and from the signal sequence obtained by cyclically shifting the first signal sequence; and wherein a third signal sequence determined in accordance with the same cell is assigned to the second-type radio communication apparatuses.

7. A radio communication method executed by a radio communication system that includes a base station and a plurality of radio communication apparatuses belonging to a same cell, the method comprising:

classifying first-type radio communication apparatuses belonging to the same cell into a plurality of groups including first and second groups, without classifying second-type radio communication apparatuses belonging to the same cell into any of the groups;

assigning to the first group a first signal sequence that has a property of being orthogonal to a signal sequence obtained by cyclically shifting the first signal sequence, assigning to the second group a second signal sequence that has a property of being orthogonal to a signal sequence obtained by cyclically shifting the second signal sequence, and assigning to the second-type radio communication apparatuses a third signal sequence determined in accordance with the same cell, the second signal sequence being different from the first signal sequence and from the signal sequence obtained by cyclically shifting the first signal sequence;

causing the radio communication apparatus belonging to the first group to perform spread modulation on data using the first signal sequence or the signal sequence obtained by cyclically shifting the first signal sequence, and transmit the data to the base station; and causing the radio communication apparatus belonging to the second group to perform spread modulation on data using the second signal sequence or the signal sequence obtained by cyclically shifting the second signal sequence, and transmit the data to the base station.

* * * * *